US008995785B2

(12) United States Patent
Knight et al.

(10) Patent No.: US 8,995,785 B2
(45) Date of Patent: *Mar. 31, 2015

(54) LIGHT-FIELD PROCESSING AND ANALYSIS, CAMERA CONTROL, AND USER INTERFACES AND INTERACTION ON LIGHT-FIELD CAPTURE DEVICES

(71) Applicant: Lytro, Inc., Mountain View, CA (US)

(72) Inventors: Timothy James Knight, Palo Alto, CA (US); Colvin Pitts, Snohomish, WA (US); Yi-Ren Ng, Palo Alto, CA (US); Alex Fishman, San Jose, CA (US); Yuriy Romanenko, Campbell, CA (US); Jeff Kalt, San Francisco, CA (US); Kurt Barton Akeley, Saratoga, CA (US)

(73) Assignee: Lytro, Inc., Mountain View, CA (US)

( * ) Notice: Subject to any disclaimer, the term of this patent is extended or adjusted under 35 U.S.C. 154(b) by 80 days.
This patent is subject to a terminal disclaimer.

(21) Appl. No.: 13/774,986

(22) Filed: Feb. 22, 2013

(65) Prior Publication Data
US 2013/0222633 A1    Aug. 29, 2013

Related U.S. Application Data

(63) Continuation-in-part of application No. 13/688,026, filed on Nov. 28, 2012, now Pat. No. 8,811,769.

(60) Provisional application No. 61/604,155, filed on Feb. 28, 2012, provisional application No. 61/604,175, filed on Feb. 28, 2012, provisional application No. 61/604,195, filed on Feb. 28, 2012, provisional application No. 61/655,790, filed on Jun. 5, 2012.

(51) Int. Cl.
*G06K 9/40* (2006.01)
*H04N 5/232* (2006.01)
*G06K 9/00* (2006.01)

(52) U.S. Cl.
CPC ....... *H04N 5/23293* (2013.01); *H04N 5/23212* (2013.01)
USPC ........................................................ 382/275

(58) Field of Classification Search
CPC ...... H04N 2213/008; G02B 6/00; G02B 7/00; G09G 3/04
USPC ...................... 382/162, 164, 165, 167; 345/6, 345/418–420, 424, 426; 348/49, 222.1, 348/333.02
See application file for complete search history.

(56) References Cited

U.S. PATENT DOCUMENTS 725,567 A     4/1903   Ives
(Continued)

FOREIGN PATENT DOCUMENTS

DE         19624421        6/1996
(Continued)

OTHER PUBLICATIONS

Sun, Jian, et al., "Stereo Matching Using Belief Propagation", 2002.
(Continued)

*Primary Examiner* — Amir Alavi
(74) *Attorney, Agent, or Firm* — Raubvogel Law Office

(57) ABSTRACT

In various embodiments, the present invention relates to methods, systems, architectures, algorithms, designs, and user interfaces for capturing, processing, analyzing, displaying, annotating, modifying, and/or interacting with light-field data on a light-field capture device. In at least one embodiment, the light-field capture device communicates to the user information about the scene during live-view to aid him or her in capturing light-field images that provide increased refocusing ability, increased parallax and perspective shifting ability, increased stereo disparity, and/or more dramatic post-capture effects. Additional embodiments present a standard 2D camera interface to software running on the light-field capture device to enable such software to function normally even though the device is actually capturing light-field data. Additional embodiments provide the ability to control camera optical elements to facilitate ease of composition and capture of light-field data, and/or generating a plurality of 2D video streams derived from a stream of light-field data.

54 Claims, 18 Drawing Sheets

(56) References Cited

U.S. PATENT DOCUMENTS

| | | | |
|---|---|---|---|
| 4,383,170 A | 5/1983 | Takagi et al. | |
| 4,661,986 A | 4/1987 | Adelson | |
| 4,694,185 A | 9/1987 | Weiss | |
| 4,920,419 A | 4/1990 | Easterly | |
| 5,076,687 A | 12/1991 | Adelson | |
| 5,282,045 A | 1/1994 | Mimura et al. | |
| 5,610,390 A | 3/1997 | Miyano | |
| 5,748,371 A | 5/1998 | Cathey, Jr. et al. | |
| 5,757,423 A | 5/1998 | Tanaka et al. | |
| 5,949,433 A | 9/1999 | Klotz | |
| 6,023,523 A | 2/2000 | Cohen et al. | |
| 6,028,606 A | 2/2000 | Kolb et al. | |
| 6,097,394 A | 8/2000 | Levoy et al. | |
| 6,201,899 B1 | 3/2001 | Bergen | |
| 6,320,979 B1 | 11/2001 | Melen | |
| 6,483,535 B1 | 11/2002 | Tamburrino et al. | |
| 6,577,342 B1 | 6/2003 | Webster | |
| 6,597,859 B1 | 7/2003 | Leinhardt et al. | |
| 6,674,430 B1* | 1/2004 | Kaufman et al. | 345/419 |
| 6,842,297 B2 | 1/2005 | Dowski, Jr. et al. | |
| 6,900,841 B1 | 5/2005 | Mihara | |
| 6,927,922 B2 | 8/2005 | George et al. | |
| 7,034,866 B1 | 4/2006 | Colmenarez et al. | |
| 7,336,430 B2 | 2/2008 | George | |
| 7,620,309 B2 | 11/2009 | Georgiev | |
| 7,623,726 B1 | 11/2009 | Georgiev | |
| 7,723,662 B2 | 5/2010 | Levoy et al. | |
| 7,936,392 B2 | 5/2011 | Ng et al. | |
| 7,945,653 B2 | 5/2011 | Zuckerberg et al. | |
| 7,949,252 B1 | 5/2011 | Georgiev | |
| 8,155,456 B2* | 4/2012 | Babacan et al. | 382/232 |
| 8,155,478 B2 | 4/2012 | Vitsnudel et al. | |
| 8,279,325 B2 | 10/2012 | Pitts et al. | |
| 8,289,440 B2 | 10/2012 | Knight et al. | |
| 8,290,358 B1 | 10/2012 | Georgiev | |
| 8,446,516 B2 | 5/2013 | Pitts et al. | |
| 8,749,620 B1* | 6/2014 | Knight et al. | 348/49 |
| 8,754,829 B2* | 6/2014 | Lapstun | 345/6 |
| 2002/0159030 A1 | 10/2002 | Frey et al. | |
| 2003/0103670 A1 | 6/2003 | Schoelkopf et al. | |
| 2003/0117511 A1 | 6/2003 | Belz et al. | |
| 2003/0156077 A1 | 8/2003 | Balogh | |
| 2004/0114176 A1 | 6/2004 | Bodin et al. | |
| 2004/0257360 A1 | 12/2004 | Sieckmann | |
| 2005/0080602 A1 | 4/2005 | Snyder et al. | |
| 2006/0130017 A1 | 6/2006 | Cohen et al. | |
| 2007/0071316 A1 | 3/2007 | Kubo | |
| 2007/0230944 A1 | 10/2007 | Georgiev | |
| 2007/0252074 A1 | 11/2007 | Ng et al. | |
| 2008/0007626 A1 | 1/2008 | Wernersson | |
| 2008/0018668 A1 | 1/2008 | Yamauchi | |
| 2008/0131019 A1 | 6/2008 | Ng | |
| 2008/0152215 A1 | 6/2008 | Horie et al. | |
| 2008/0180792 A1 | 7/2008 | Georgiev | |
| 2008/0187305 A1 | 8/2008 | Raskar et al. | |
| 2008/0193026 A1 | 8/2008 | Horie et al. | |
| 2008/0226274 A1 | 9/2008 | Spielberg | |
| 2008/0266655 A1 | 10/2008 | Levoy et al. | |
| 2008/0277566 A1 | 11/2008 | Utagawa | |
| 2008/0309813 A1 | 12/2008 | Watanabe | |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0102956 A1 | 4/2009 | Georgiev | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0190022 A1 | 7/2009 | Ichimura | |
| 2009/0190024 A1 | 7/2009 | Hayasaka et al. | |
| 2009/0268970 A1 | 10/2009 | Babacan et al. | |
| 2009/0273843 A1 | 11/2009 | Raskar et al. | |
| 2009/0295829 A1 | 12/2009 | Georgiev et al. | |
| 2010/0026852 A1 | 2/2010 | Ng et al. | |
| 2010/0128145 A1 | 5/2010 | Pitts et al. | |
| 2010/0129048 A1 | 5/2010 | Pitts et al. | |
| 2010/0141802 A1 | 6/2010 | Knight et al. | |
| 2010/0277629 A1 | 11/2010 | Tanaka | |
| 2011/0129165 A1 | 6/2011 | Lim et al. | |
| 2011/0234841 A1 | 9/2011 | Akeley et al. | |
| 2012/0050562 A1 | 3/2012 | Perwass et al. | |
| 2012/0249550 A1 | 10/2012 | Akeley et al. | |
| 2012/0327222 A1 | 12/2012 | Ng et al. | |
| 2013/0033636 A1 | 2/2013 | Pitts et al. | |
| 2013/0113981 A1 | 5/2013 | Knight et al. | |
| 2013/0222633 A1* | 8/2013 | Knight et al. | 348/222.1 |
| 2014/0146201 A1* | 5/2014 | Knight et al. | 348/231.99 |

FOREIGN PATENT DOCUMENTS

| | | |
|---|---|---|
| WO | 03052465 | 6/2003 |
| WO | 2006039486 | 4/2006 |
| WO | 2006129677 | 12/2006 |
| WO | 2007092545 | 8/2007 |
| WO | 2007092581 | 8/2007 |

OTHER PUBLICATIONS

Tagging photos on Flickr, Facebook and other online photo sharing sites (see, for example, http://support.gnip.com/customer/portal/articles/809309-flickr-geo-photos-tag-search). Retrieved Jan. 2013.

Takahashi, Keita, et al., "All in-focus View Synthesis from Under-Sampled Light Fields", ICAT 2003, Tokyo, Japan.

Design of the xBox menu. Retrieved Jan. 2013.

Williams, L., "Pyramidal Parametrics", Computer Graphics (1983).

Wuu, S., et al., "Back-Side Illumination Technology using Bulk-si Substrate for Advanced CMOS Image Sensors", 2009 International Image Sensor Workshop, Bergen, Norway.

Wuu, S., et al., "BSI Technology with Bulk Si Wafer", 2009 International Image Sensor Workshop, Bergen, Norway.

Zoberbier, M., et al., "Wafer Level Cameras", 2009 International Image Sensor Workshop, Bergen, Norway.

Portable Network Graphics format: http://en.wikipedia.org/wiki/Portable_Network_Graphics. Retrieved Jan. 2013.

Exchangeable image file format: http://en.wikipedia.org/wiki/Exchangeable_image_file_format. Retrieved Jan. 2013.

Extensible Metadata Platform: http://en.wikipedia.org/wiki/Extensible_Metadata_Platform. Retrieved Jan. 2013.

Compression standard JPEG XR: http://en.wikipedia.org/wiki/JPEG_XR. Retrieved Jan. 2013.

Methods of Variable Bitrate Encoding (http://en.wikipedia.org/wiki/Variable_bitrate#Methods_of_VBR_encoding). Retrieved Jan. 2013.

Lazy loading of image data (http://en.wikipedia.org/wiki/Lazy_loading). Retrieved Jan. 2013.

Key framing for video animation (http://en.wikipedia.org/wiki/Key_frame). Retrieved Jan. 2013.

Data overlay techniques for real-time visual feed. For example, heads-up displays (http://en.wikipedia.org/wiki/Head-up_display). Retrieved Jan. 2013.

Autofocus systems and methods (http://en.wikipedia.org/wiki/Autofocus). Retrieved Jan. 2013.

Nakamura, J., "Image Sensors and Signal Processing for Digital Still Cameras" (Optical Science and Engineering), 2005.

Debevec et al., "A Lighting Reproduction Approach to Live-Action Compositing", Proceedings SIGGRAPH 2002.

Malzbender, et al., "Polynomial Texture Maps", Proceedings SIGGRAPH 2001.

Wenger, et al, "Performance Relighting and Reflectance Transformation with Time-Multiplexed Illumination", Institute for Creative Technologies, SIGGRAPH 2005.

Ng, R., et al., "All-Frequency Shadows Using Non-linear Wavelet Lighting Approximation. ACM Transactions on Graphics" (Proceedings of SIGGRAPH 2003).

Chen, W., et al., "Light field mapping: Efficient representation and hardware rendering of surface light fields". ACM Transactions on Graphics 21, 3, 447-456, 2002.

Debevec, P., et al., "Recovering high dynamic range radiance maps from photographs", SIGGRAPH 1997, 369-378.

(56) References Cited

OTHER PUBLICATIONS

Debevec, P., et al., "Acquiring the reflectance field of a human face", SIGGRAPH 2000.
Dorsey, J., et al., "Design and simulation of opera lighting and projection effects", In Computer Graphics (Proceedings of SIGGRAPH 91), vol. 25, 41-50.
Nimeroff, J., et al., "Efficient rerendering of naturally illuminated environments", in Fifth Eurographics Workshop on Rendering, 359-373, 1994.
Ramamoorthi, R., et al., "An efficient representation for irradiance environment maps", in Proceedings of SIGGRAPH 2001, 497-500.
Sloan, P., et al., "Precomputed radiance transfer for real-time rendering in dynamic, low-frequency lighting environments", ACM Transactions on Graphics 21, 3, 527-536, 2002.
Teo, P., et al., "Efficient linear rerendering for interactive lighting design", Tech. Rep. STAN-CS-TN-97-60, 1997, Stanford University.
Ng, R., et al., "Triple Product Wavelet Integrals for All-Frequency Relighting", ACM Transactions on Graphics (Proceedings of SIGGRAPH 2004).
Dorsey, J., et al., "Interactive design of complex time dependent lighting", IEEE Computer Graphics and Applications 15, 2 (Mar. 1995), 26-36.
Kautz, J., et al., "Fast arbitrary BRDF shading for low-frequency lighting using spherical harmonics", in Eurographics Rendering Workshop 2002, 291-296.
Lehtinen, J., et al., "Matrix radiance transfer", in Symposium on Interactive 3D graphics, 59-64, 2003.
Ramamoorthi, R., et al., "Frequency space environment map rendering", ACM Transactions on Graphics SIGGRAPH 2002 proceedings) 21, 3, 517-526.
Winnemöller, H., et al., "Light Waving: Estimating Light Positions From Photographs Alone", Eurographics 2005.
Masselus, Vincent et al., "Relighting with 4D Incident Light Fields", SIGGRAPH 2003.
Fattal, Raanan et al., "Multiscale Shape and Detail Enhancement from Multi-light Image Collections", SIGGRAPH 2007.
Petschnigg, George et al., "Digital Photography with Flash and No-Flash Image Pairs", SIGGRAPH 2004.
Eisemann, Elmar et al., "Flash Photography Enhancement via Intrinsic Relighting", SIGGRAPH 2004.
Raskar, Ramesh et al., "Non-photorealistic Camera: Depth Edge Detection and Stylized Rendering using Multi-Flash Imaging", SIGGRAPH 2004.
Canon Speedlite wireless flash system: see, for example, User manual for Model 550EX. Sep. 1998.
Belhumeur, Peter et al., "The Bas-Relief Ambiguity", International Journal of Computer Vision, 1997, pp. 1060-1066.
Belhumeur, Peter et al., "The Bas-Relief Ambiguity", International Journal of Computer Vision, 1999, pp. pp. 33-44, revised version.
Wetzstein, Gordon, et al., "Sensor Saturation in Fourier Multiplexed Imaging", IEEE Conference on Computer Vision and Pattern Recognition (2010).
Wilburn, Bennett, et al., "High Speed Video Using a Dense Camera Array", 2004.
Wilburn, Bennett, et al., "The Light Field Video Camera", Proceedings of Media Processors 2002.
Nayar, Shree, et al., "Shape from Focus", IEEE Transactions on Pattern Analysis and Machine Intelligence, vol. 16, No. 8, pp. 824-831, Aug. 1994.
Levoy, Marc, "Autofocus: Phase Detection", http://graphics.stanford.edu/courses/cs178/applets/autofocusPD.html, pp. 1-3, 2010.
Sony Corporation, "Interchangeable Lens Digital Camera Handbook", 2011.
Adelson et al., "Single Lens Stereo with a Plenoptic Camera" IEEE Translation on Pattern Analysis and Machine Intelligence, Feb. 1992. vol. 14, No. 2, pp. 99-106.
Agarwala, A., et al., "Interactive Digital Photomontage," ACM Transactions on Graphics, Proceedings of SIGGRAPH 2004, vol. 32, No. 3, 2004.

Jin-Xang Chai et al., "Plenoptic Sampling", ACM SIGGRAPH 2000, Annual Conference Series, 2000, pp. 307-318.
Dowski et al., "Wavefront coding: a modern method of achieving high performance and/or low cost imaging systems" SPIE Proceedings, vol. 3779, Jul. 1999, pp. 137-145.
Georgiev, T., et al., "Spatio-Angular Resolution Tradeoff in Integral Photography," Proceedings of Eurographics Symposium on Rendering, 2006.
Gortler et al., "The lumigraph" SIGGRAPH 96, pp. 43-54.
Haeberli, "A Multifocus Method for Controlling Depth of Field" GRAPHICA Obscura, 1994, pp. 1-3.
Isaksen, A., et al., "Dynamically Reparameterized Light Fields," SIGGRAPH 2000, pp. 297-306.
Ives, H., "Optical properties of a Lippman lenticulated sheet," J. Opt. Soc. Am. 21, 171 (1931).
Jackson et al., "Selection of a Convolution Function for Fourier Inversion Using Gridding" IEEE Transactions on Medical Imaging, Sep. 1991, vol. 10, No. 3, pp. 473-478.
Levoy, M., et al., "Light Field Microscopy," ACM Transactions on Graphics, vol. 25, No. 3, Proceedings SIGGRAPH 2006.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Lippmann, "Reversible Prints", Communication at the French Society of Physics, Journal of Physics, Mar. 20, 1908, pp. 821-825.
Lumsdaine et al., "Full Resolution Lightfield Rendering" Adobe Technical Report Jan. 2008, pp. 1-12.
Naemura et al., "3-D Computer Graphics based on Integral Photography" Optics Express, Feb. 12, 2001. vol. 8, No. 2, pp. 255-262.
Ng, R., et al. "Light Field Photography with a Hand-held Plenoptic Camera," Stanford Technical Report, CSTR 2005-2, 2005.
Ng, R., "Digital Light Field Photography," Dissertation, Department of Computer Science, Stanford University, Jun. 2006.
Ng., R., "Fourier Slice Photography," ACM Transactions on Graphics, Proceedings of SIGGRAPH 2005, vol. 24, No. 3, 2005, pp. 735-744.
Okano et al., "Three-dimensional video system based on integral photograohy" Optical Engineering, Jun. 1999, vol. 38, No. 6, pp. 1072-1077.
Sokolov, "Autostereoscopy and Integral Photography by Professor Lippmann's Method", 1911, pp. 23-29.
Tanida et al., "Thin observation module by bound optics (TOMBO): concept and experimental verification" Applied Optics 40, 11 (Apr. 10, 2001), pp. 1806-1813.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
Vaish et al., "Using plane + parallax for calibrating dense camera arrays", In Proceedings CVPR 2004, pp. 2-9.
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Adobe Systems Incorporated, "XMP Specification", Sep. 2005.
Fitzpatrick, Brad, "Camlistore", Feb. 1, 2011.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Adobe, "Photoshop CS6 / in depth: Digital Negative (DNG)", http://www.adobe.com/products/photoshop/extend.displayTab2html. Retrieved Jan. 2013.
Apple, "Apple iPad: Photo Features on the iPad". Retrieved Jan. 2013.
Bolles, R., et al., "Epipolar-Plane Image Analysis: An Approach to Determining Structure from Motion", International Journal of Computer Vision, 1, 7-55 (1987).
TechCrunch, "Cooliris". Retrieved Jan. 2013.
Daly, D., "Microlens Array". Retrieved Jan. 2013.
Georgiev, T., et al., Plenoptic Camera 2.0 (2008).
Georgiev, T., et al., "Unified Frequency Domain Analysis of Lightfield Cameras" (2008).

(56) References Cited

OTHER PUBLICATIONS

Girod, B., "Mobile Visual Search", IEEE Signal Processing Magazine, Jul. 2011.
Hirigoyen, F., et al., "1.1 um Backside Imager vs. Frontside Image: an optics-dedicated FDTD approach", IEEE 2009 International Image Sensor Workshop.
Ives, Herbert, "Parallax Panoramagrams Made with a Large Diameter Lens", 1930.
Kopf, J., et al., Deep Photo: Model-Based Photograph Enhancement and Viewing, SIGGRAPH Asia 2008.
Lesser, Michael, "Back-Side Illumination", 2009.
Liang, Chia-Kai, et al., "Programmable Aperture Photography: Multiplexed Light Field Acquisition", ACM SIGGRAPH 2008.
Mallat, Stephane, "A Wavelet Tour of Signal Processing", Academic Press 1998.
Nokia, "City Lens", May 2012.
Ogden, J., "Pyramid-Based Computer Graphics", 1985.
Pain, B., "Back-Side Illumination Technology for SOI-CMOS Image Sensors", 2009.
PrimeSense, "The Primesense 3D Awareness Sensor", 2007.
Shreiner, OpenGL Programming Guide, 7th edition, Chapter 8, 2010.
SimpleViewer, "Tiltview", http://www.simpleviewer.net/tiltviewer. Retrieved Jan. 2013.
Snavely, Noah, et al., "Photo tourism: Exploring photo collections in 3D", ACM Transactions on Graphics (SIGGRAPH Proceedings), 2006.
Story, D., "The Future of Photography", Optics Electronics, Oct. 2008.

* cited by examiner

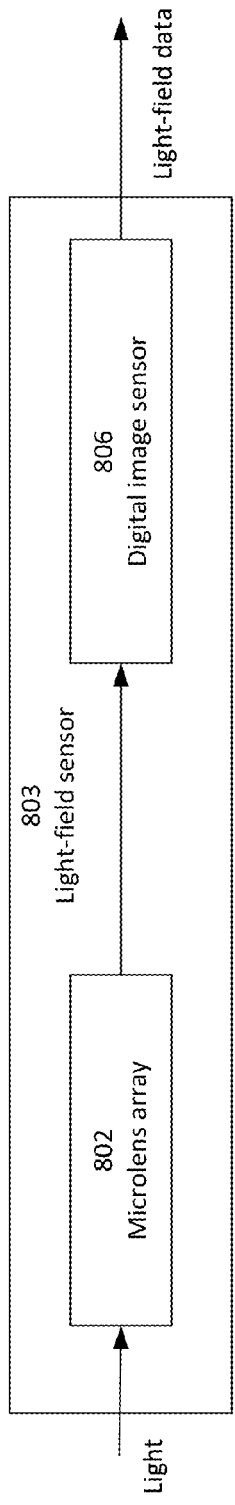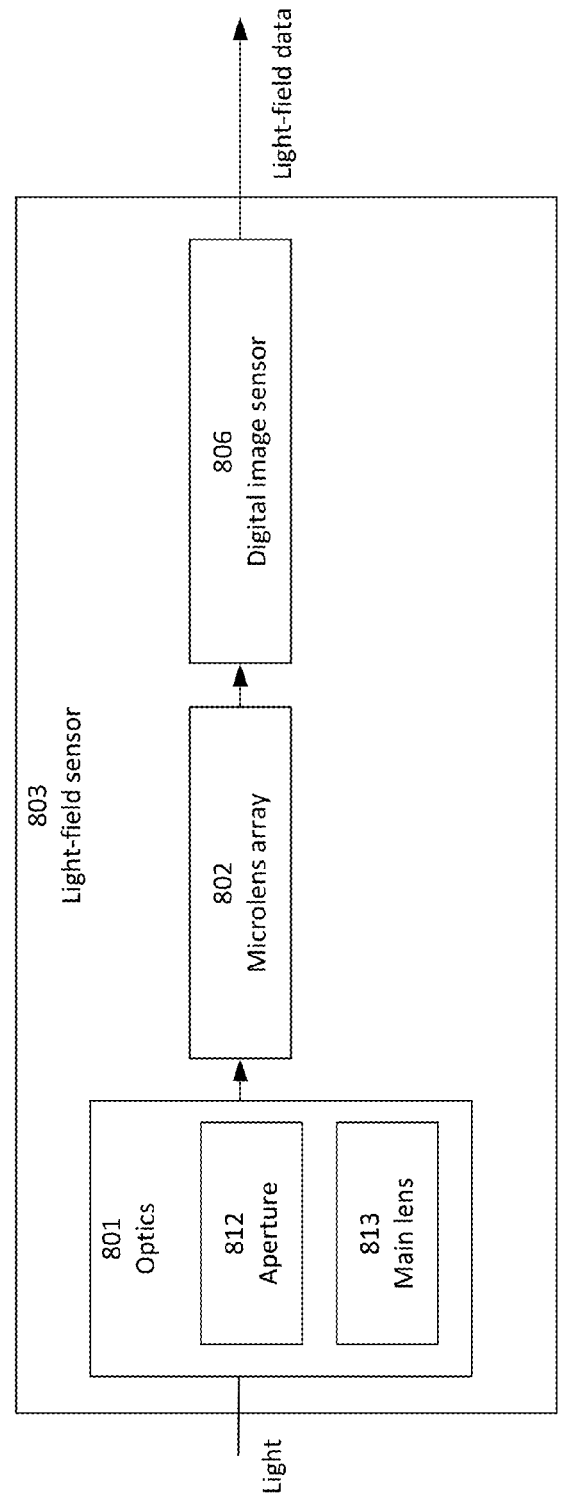

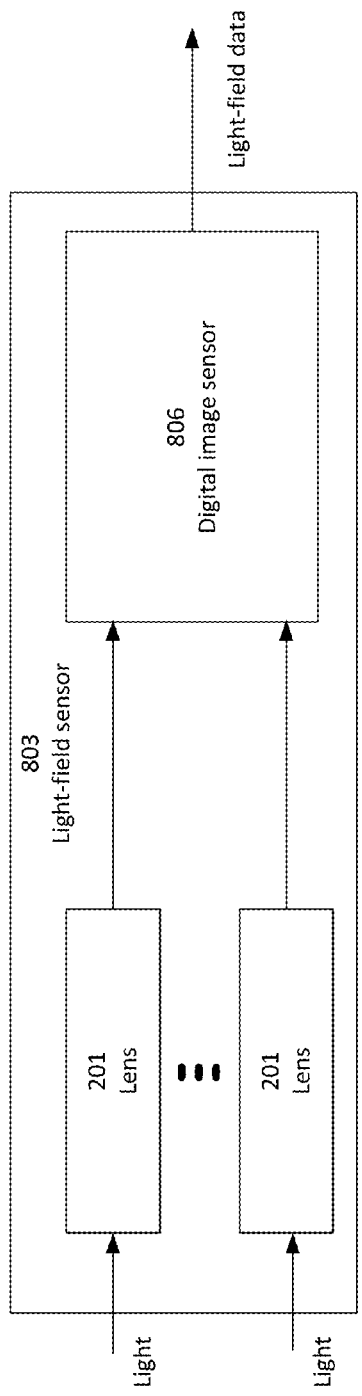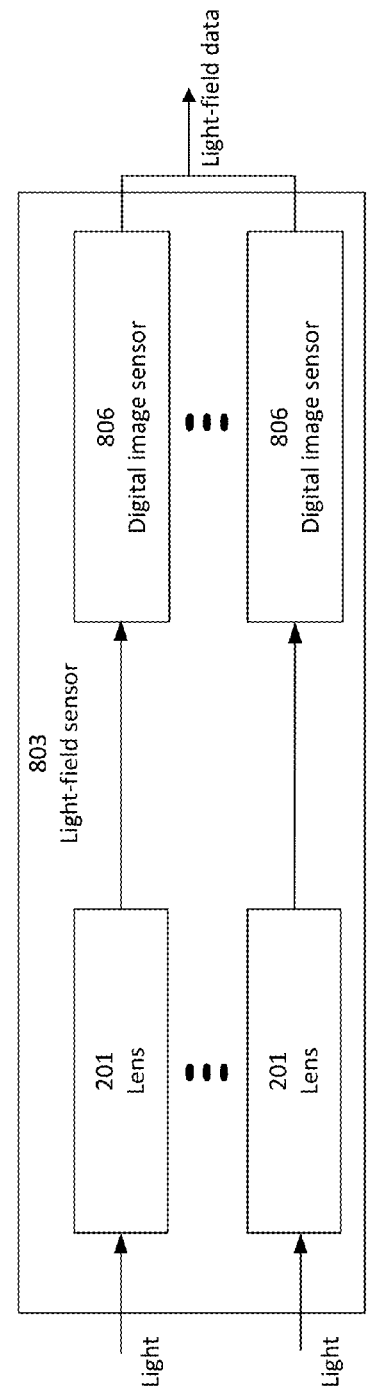

LIGHT-FIELD PROCESSING AND ANALYSIS, CAMERA CONTROL, AND USER INTERFACES AND INTERACTION ON LIGHT-FIELD CAPTURE DEVICES

CROSS-REFERENCE TO RELATED APPLICATIONS

The present application claims priority from U.S. Provisional Application Ser. No. 61/604,155 for "Compensating for Sensor Saturation and Microlens Modulation during Light-Field Image Processing", filed on Feb. 28, 2012, the disclosure of which is incorporated herein by reference in its entirety.

The present application further claims priority from U.S. Provisional Application Ser. No. 61/604,175 for "Compensating for Variation in Microlens Position during Light-Field Image Processing", filed on Feb. 28, 2012, the disclosure of which is incorporated herein by reference in its entirety.

The present application further claims priority from U.S. Provisional Application Ser. No. 61/604,195 for "Light-Field Processing and Analysis, Camera Control, and User Interfaces and Interaction on Light-Field Capture Devices", filed on Feb. 28, 2012, the disclosure of which is incorporated herein by reference in its entirety.

The present application further claims priority from U.S. Provisional Application Ser. No. 61/655,790 for "Extending Light-Field Processing to Include Extended Depth of Field and Variable Center of Perspective", filed on Jun. 5, 2012, the disclosure of which is incorporated herein by reference in its entirety.

The present application further claims priority as a continuation-in-part of U.S. Utility application Ser. No. 13/688,026 for "Extended Depth of Field and Variable Center of Perspective In Light-Field Processing", filed on Nov. 28, 2012, now U.S. Pat. No. 8,811,769 the disclosure of which is incorporated herein by reference in its entirety.

The present application is related to U.S. Utility application Ser. No. 11/948,901 for "Interactive Refocusing of Electronic Images,", filed Nov. 30, 2007, the disclosure of which is incorporated herein by reference in its entirety.

The present application is related to U.S. Utility application Ser. No. 12/703,367 for "Light-field Camera Image, File and Configuration Data, and Method of Using, Storing and Communicating Same,", filed Feb. 10, 2010, the disclosure of which is incorporated herein by reference in its entirety.

The present application is related to U.S. Utility application Ser. No. 13/027,946 for "3D Light-field Cameras, Images and Files, and Methods of Using, Operating, Processing and Viewing Same", filed on Feb. 15, 2011, the disclosure of which is incorporated herein by reference in its entirety.

The present application is related to U.S. Utility application Ser. No. 13/155,882 for "Storage and Transmission of Pictures Including Multiple Frames," filed Jun. 8, 2011, the disclosure of which is incorporated herein by reference in its entirety.

The present application is related to U.S. Utility application Ser. No. 13/664,938 for "Light-field Camera Image, File and Configuration Data, and Method of Using, Storing and Communicating Same,", filed Oct. 31, 2012, the disclosure of which is incorporated herein by reference in its entirety.

The present application is related to U.S. Utility application Ser. No. 13/774,925 for "Compensating for Sensor Saturation and Microlens Modulation During Light-Field Image Processing,", filed on the same date as the present application, the disclosure of which is incorporated herein by reference in its entirety.

The present application is related to U.S. Utility application Ser. No. 13/774,971 for "Compensating for Variation in Microlens Position During Light-Field Image Processing,", filed on the same date as the present application, the disclosure of which is incorporated herein by reference in its entirety.

FIELD OF THE INVENTION

The present invention relates to systems and methods for capturing, processing, and displaying light-field image data.

BACKGROUND

Light-field capture devices (also referred to as "light-field image data acquisition devices") are defined herein as any devices that are capable of capturing light-field data, optionally processing light-field data, optionally accepting and acting upon user input, and optionally displaying or otherwise outputting images and/or other types of data.

Light-field capture devices may capture light-field data using any suitable method for doing so. One example of such a method includes, without limitation, using a microlens array on top of an image sensor (e.g., a CCD or CMOS sensor) as described in Ng et al., Light-field photography with a hand-held plenoptic capture device, Technical Report CSTR 2005-02, Stanford Computer Science. Other examples include the use of a plurality of independently controlled cameras, each with its own lens and sensor, an array of cameras that image onto a single shared sensor, a plenoptic lens, and/or any combination of these.

Light-field data may be represented or encoded in any of a number of different ways, including (but not limited to) as a 4D image, as a 2D array of 2D disk images such as described in Ng et al., as a 2D array of 2D images of a scene taken from different perspectives such as would be captured by an array of cameras (and which are known as "sub-aperture" images in Ng et al.), and as any combination of these.

Whichever representation is used, light-field data captured by a light-field capture device may be processed to produce a 2D image that is suitable for display or output. Such light-field processing can include (but is not limited to) generating refocused images, generating perspective views of a scene, generating depth maps of a scene, generating all-in-focus or extended depth of field (EDOF) images, generating parallax-shifted or perspective views of a scene, generating stereo image pairs, and/or any combination of these. Additionally, such generated 2D images may be modified or annotated based on the results of analysis of the light-field data performed by algorithms that process the captured light-field data.

Data captured by light-field capture devices contains information from which scene depths may be inferred or measured, and the range of depths captured in a scene is related to the set of possible 2D images which may be rendered from (or projected from) the captured light-field data. The "amount of refocusing", the "3D-ness", and the range of perspective/parallax shifting that is possible from a captured set of light-field data is, in general, proportional to the dioptric range of scene depths that were captured. However, a standard 2D preview image of a scene, as is used by conventional cameras, does not generally communicate to the user the extent to which the range of depths captured is suitable for generating compelling output images with large amounts of refocusing, 3D, parallax/perspective shifting, or any other effects that may be generated from captured light-field data.

Additionally, some features or capabilities that are commonplace in conventional cameras may not be generally available in light-field capture devices unless the captured light-field data is suitably processed. One example of such a feature is the ability to record 2D video streams on the device. Another example is the ability of the device to host applications that are able to access the camera system and which expect 2D image data to be produced by it (for example, photo and camera apps on mobile devices such as native iOS and Android camera apps, as well as third-party mobile apps such as Instagram). Conventionally, such applications may not run properly on a light-field capture device, particularly if the capture device does not properly process the captured light-field data to make it available as a conventional 2D image stream for such applications.

SUMMARY

According to various embodiments, the system and method of the present invention implement various types of light-field processing and analysis, camera control, and user interfaces and interaction on light-field capture devices.

In various embodiments, the present invention relates to methods, systems, architectures, algorithms, designs, and user interfaces for capturing, processing, analyzing, displaying, annotating, modifying, and/or interacting with light-field data on a light-field capture device, and may be characterized as including one or more of the following components or aspects, either singly or in any suitable combination:

Communicating to the user of the light-field capture device information about the scene during live-view to aid him or her in capturing light-field images that provide improved capability to generate 2D images with increased refocusing ability, increased parallax and perspective shifting ability, increased stereo disparity, and/or more dramatic post-capture effects.

Control of camera optical elements (for example in camera lenses with moving zoom or focus motors) during live-view and capture to facilitate the user's ease of composition and capture of light-field data for a scene, so that the resultant light-field data can be used to generate a set of 2D output images that encompass the scene objects of interest.

Presenting a standard 2D camera interface to software running on the light-field capture device to enable such software to function normally without needing to be modified to handle the fact that the device is actually capturing light-field data.

Generating a plurality of 2D video streams that are derived from the stream of light-field data that is produced by the light-field capture device, where the 2D video streams are interoperable with standard video players and are generated automatically and/or under the user's guidance or direction to provide certain effects such as refocusing, parallax or perspective shifting, all-in-focus, depth-based processing, and/or any other effect that can be generated by processing light-field data.

Some aspects of various embodiments of the invention described herein relate to light-field processing, analysis, and display of the real-time live-view stream of a light-field capture device to output images, numeric data, labels, and any other data on the light-field capture device's display (such as its LCD screen) that communicate such information to the user.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIGS. 2A through 2D depict examples of architectures of light-field sensors according to various embodiments.

DETAILED DESCRIPTION

Definitions

Figure 1A:
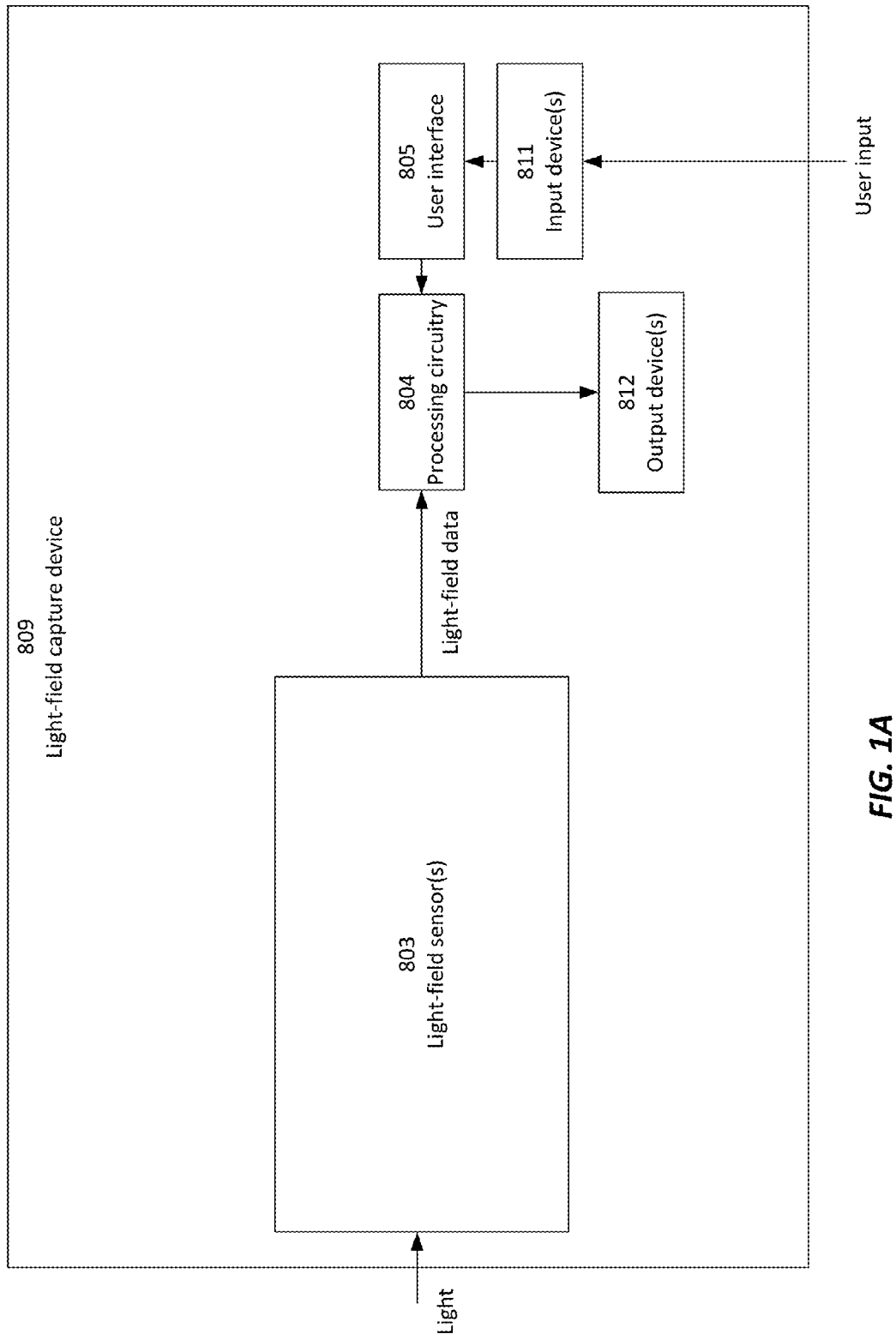
FIG. 1A depicts an example of an architecture for implementing the present invention in a light-field capture device, according to one embodiment.

For purposes of the description provided herein, the following definitions are used:

live-view capture: the acquisition of data from one or more sensors at real-time, video, and/or live-view rates, which may occur on a continuous basis and which does not result in the acquired data being stored for later review.

still capture: the acquisition of data as a result of user input, such as for example pressing a shutter button, where the acquired data is transferred or stored for later review.

video capture: the continuous acquisition of data that is transferred or stored as a video stream for later review, where the video capture occurs over some specific time interval for example as demarked by the user pressing the shutter button to start and stop the capture activity.

capture: can refer to either or both of still capture or video capture.

pre-capture processing or live-view processing: operations that are performed in real-time on acquired live-view data.

post-capture processing: operations that are performed on stored or transferred acquired data, rather than on the real-time live-view acquired data.

captured live-view data: data that is acquired during live-view operation and which may be processed and/or displayed as part of the real-time live-view mode of operation.

captured data: data that is acquired as part of a still or video capture operation and which may be transferred or stored for later review.

image: a two-dimensional array of pixel values, or pixels, each specifying a color.

light-field image: an image that contains a representation of light field data captured at the sensor.

microlens: a small lens, typically one in an array of similar microlenses.

refocusable range: the range of scene depths which may be made to appear sharp and "in focus" in generated refocused 2D images for a particular device having particular parameters.

In addition, for ease of nomenclature, the term "camera" is used herein to refer to an image capture device or other image data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In the following description, several techniques and methods for processing light-field images are described. One skilled in the art will recognize that these various techniques and methods can be performed singly and/or in any suitable combination with one another.

Architecture

In at least one embodiment, the system and method described herein can be implemented in connection with light-field images captured by light-field capture devices including but not limited to those described in Ng et al., Light-field photography with a hand-held plenoptic capture device, Technical Report CSTR 2005-02, Stanford Computer Science. Referring now to FIG. 1A, there is shown a block diagram depicting an architecture for implementing the present invention in a light-field capture device 809. Examples of light-field capture devices 809 include (but are not limited to) light-field still and video cameras. One skilled in the art will recognize that the particular configuration shown in FIG. 1A is merely exemplary, and that other architectures are possible for light-field capture device 809. One skilled in the art will further recognize that several of the components shown in the configuration of FIG. 1A are optional, and may be omitted or reconfigured.

In at least one embodiment, device 809 may be a light-field camera that includes light field sensor(s) 803 capable of detecting light. Light-field data from sensor(s) 803 are processed by processing circuitry 804, and presented as output on output device(s) 812. In at least one embodiment, the output presented on device(s) 812 can be 2D projections of light-field data, as generated by processing circuitry 804.

In at least one embodiment, device 809 also includes input device(s) 811 such as, for example, a touchscreen, buttons, keyboard, pointing device, and/or any combination thereof. A user interacts with user interface 805 via input device(s) 811 to control the operation of processing circuitry 804, for example to cause processing circuitry 804 to generate refocused 2D image data from light-field data at different focus depths. In various embodiments, user interface 805 can also allow the user to provide input for controlling any suitable aspects of the operation of camera 800 for capturing, acquiring, storing, and/or processing image data.

Light-field sensor(s) 303 can include physical and/or electronic components for capturing light-field data describing a scene. Referring now to FIGS. 2A through 2D, there are shown depict examples of architectures of light-field sensors 303 according to various embodiments. FIG. 2A depicts an example wherein sensor 803 includes microlens array 802 and digital image sensor 806. FIG. 2B depicts another example wherein sensor 803 includes optics 801, as well as microlens array 802 and digital image sensor 806. Optics 801 may include, for example, aperture 812 for allowing a selectable amount of light into device 809, and main lens 813 for focusing light toward microlens array 802. As described in the above-cited related patent applications, microlens array 802 may be disposed and/or incorporated in the optical path of device 809 (between main lens 813 and digital image sensor 806) so as to facilitate acquisition, capture, sampling of, recording, and/or obtaining light-field image data via digital image sensor 806.

Figure 1B:
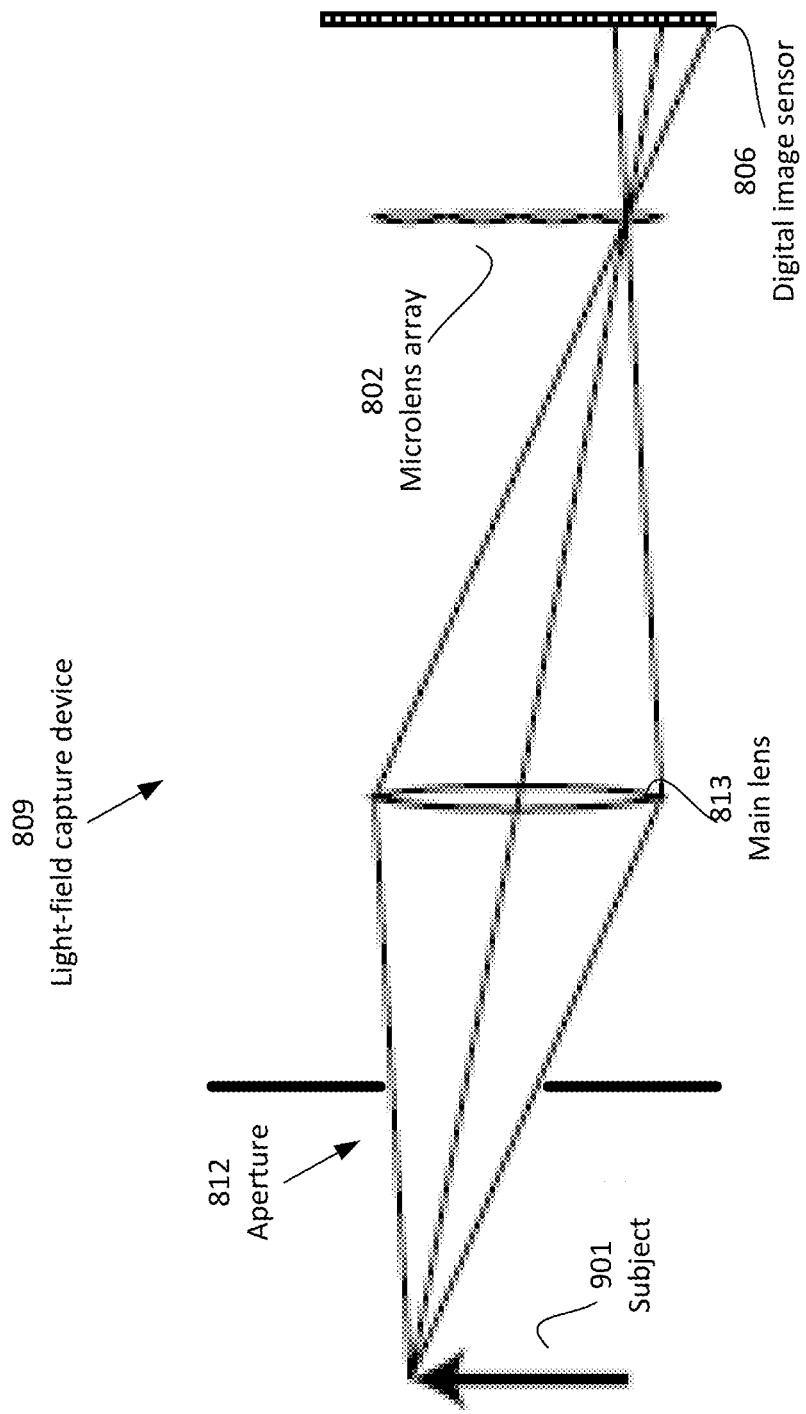
FIG. 1B depicts an example of an architecture for a light-field capture device for implementing the present invention according to one embodiment.

Referring now also to FIG. 1B, there is shown an example of an architecture for a light-field capture device 809 for implementing the present invention according to one embodiment. The Figure is not shown to scale. FIG. 1B shows, in conceptual form, the relationship between aperture 812, main lens 813, microlens array 802, and digital image sensor 806, as such components interact to capture light-field data for subject 901.

In at least one embodiment, device 809 may include memory (not shown) for storing image data, such as output by light-field sensor(s) 803. Such memory can include external and/or internal memory. In at least one embodiment, memory can be provided at a separate device and/or location from device 809.

In at least one embodiment, captured light-field data is provided to processing circuitry 804. Such circuitry 804 may be disposed in or integrated into light-field capture device 809, as shown in FIG. 1A, or it may be in a separate component external to light-field capture device 809. Such separate component may be local or remote with respect to light-field image capture device 809. Any suitable wired or wireless protocol can be used for transmitting light-field data to circuitry 804; for example device 809 can transmit light-field data and/or other data via the Internet, a cellular data network, a WiFi network, a BlueTooth communication protocol, and/or any other suitable means.

Referring now to FIGS. 2C and 2D, alternative embodiments are shown, depicting light-field sensors 803 constructed with arrays of lenses 201 and lens 201/sensor 806 pairs, respectively.

Figure 2E:
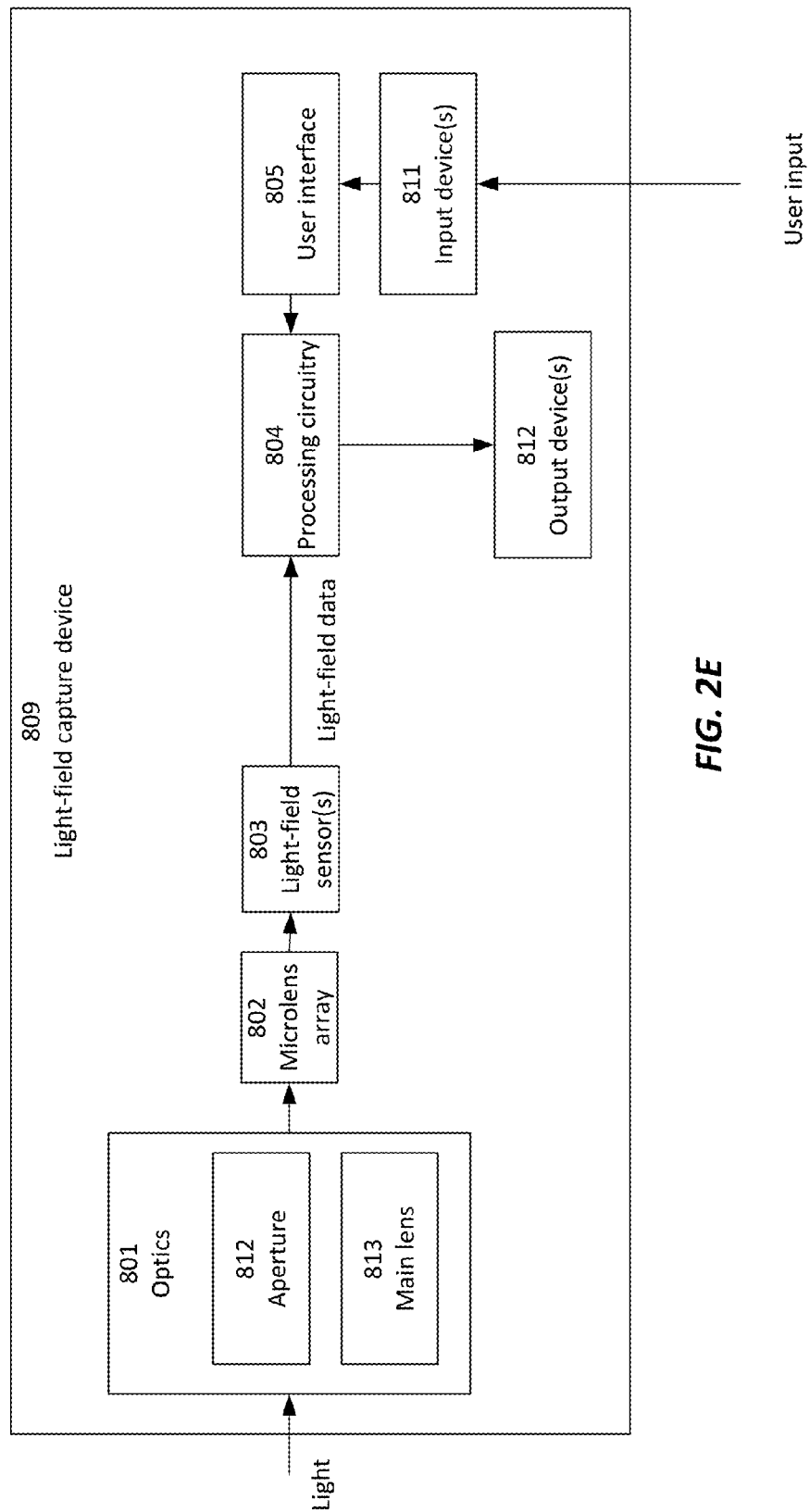
FIG. 2E depicts an example of an overall architecture of a light-field capture device wherein optics and microlens array are shown as separate components from light-field sensor(s), according to one embodiment.

Referring now to FIG. 2E, there is shown an example of an overall architecture of a light-field capture device 809 wherein optics 801 and microlens array 802 are shown as separate components from light-field sensor(s) 803, according to one embodiment.

Overview

In at least one embodiment, a user can capture and view images using light-field capture device 809 as follows. A live-view mode is activated, wherein image data captured by sensor(s) 803 and processed by processing circuitry 804 are provided to a display screen or other output device 812 at a video rate (such as, for example, 30 frames per second). Processing can thus occur at a rate compatible with the refresh rate of output device 812, so as to produce and display a stream of screen-resolution images.

While the live images are being displayed on output device 812, the user may interact with input device 811 or other controls on device 809 (the camera), for example by zooming and/or focusing lens 813, and can see the resultant changes to the data that device 809 is capturing reflected in real-time on output device 812.

At some point, the user may press a shutter button to cause device 809 to capture a still image, and the data representing the still image may be separately processed, transferred, and/or stored for later review. The contents of the still image typically reflect the scene as it was previewed for the user on output device 812 in the displayed real-time live-view stream.

A variation of this is device 809 in which pressing the shutter button causes images that have already been read out from sensor 803 and displayed in the live-view stream to be stored; such a device 809 maintains a buffer of recent frames, which are stored when the shutter button is pressed.

Video can also be captured. The user may start and stop device 809 as desired, and can cause device 809 to generate an output video file from the read out sensor images.

Images that have been captured and stored may be later interacted with and/or viewed, either on-camera (in a so-called "playback" mode), or off-camera, for example on a computing device and/or on the web.

User Aids for Light-Field Capture

In at least one embodiment, methods, systems, algorithms, designs, and user interfaces of the present invention communicate to the user of light-field capture device 809 information about the scene during live-view to aid the user in capturing light-field images that provide improved capability to generate 2D images with increased refocusing ability, increased parallax and perspective shifting ability, increased stereo disparity, and/or more dramatic post-capture effects, and/or any suitable combination thereof. In at least one embodiment, this technique involves providing feedback to the user while he or she is capturing light-field images.

Figure 9A:
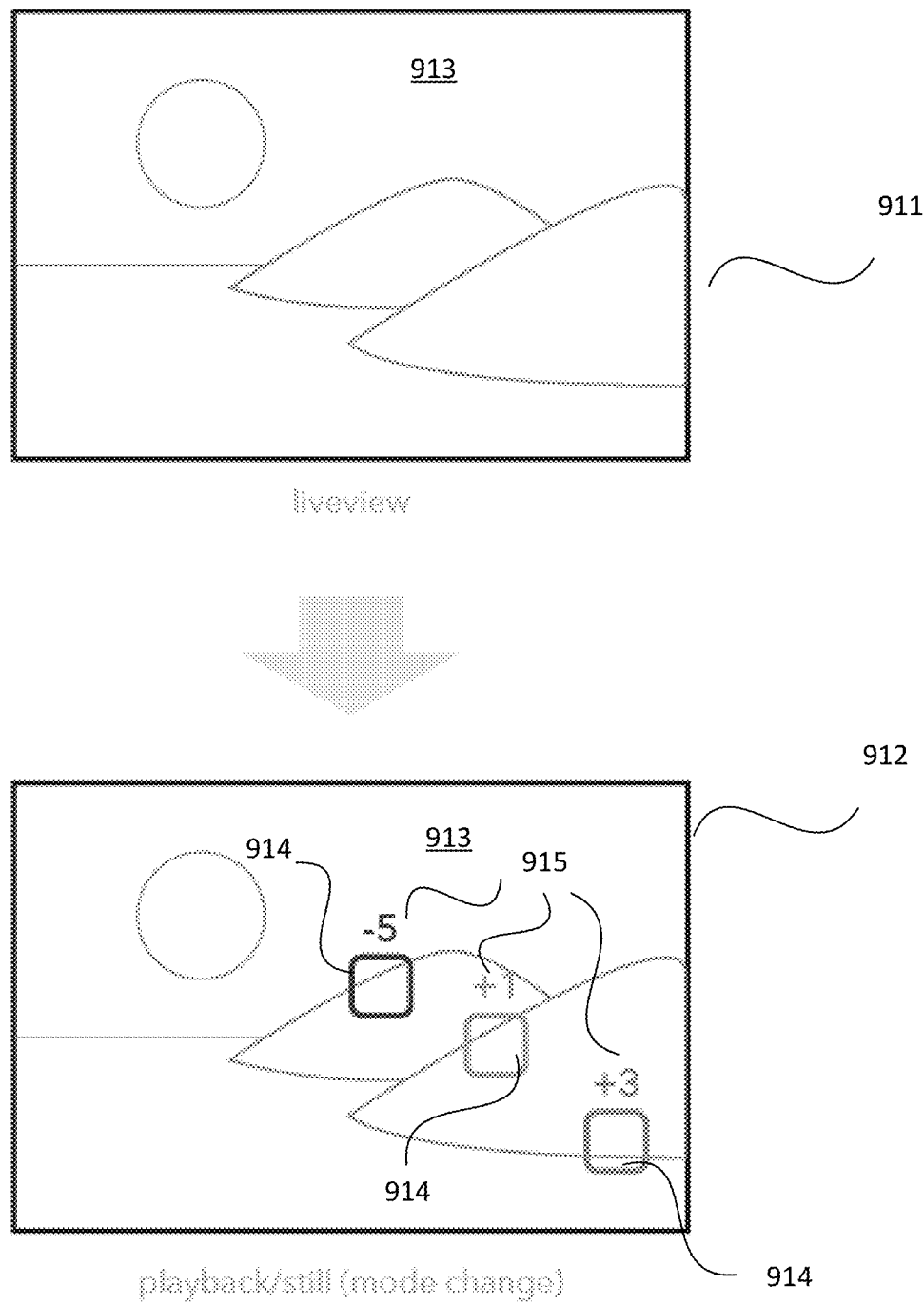
FIGS. 9A through 9C are screen shots depicting examples of a user interface for providing information and feedback to aid a user in capturing light-field images.
Figure 9B:
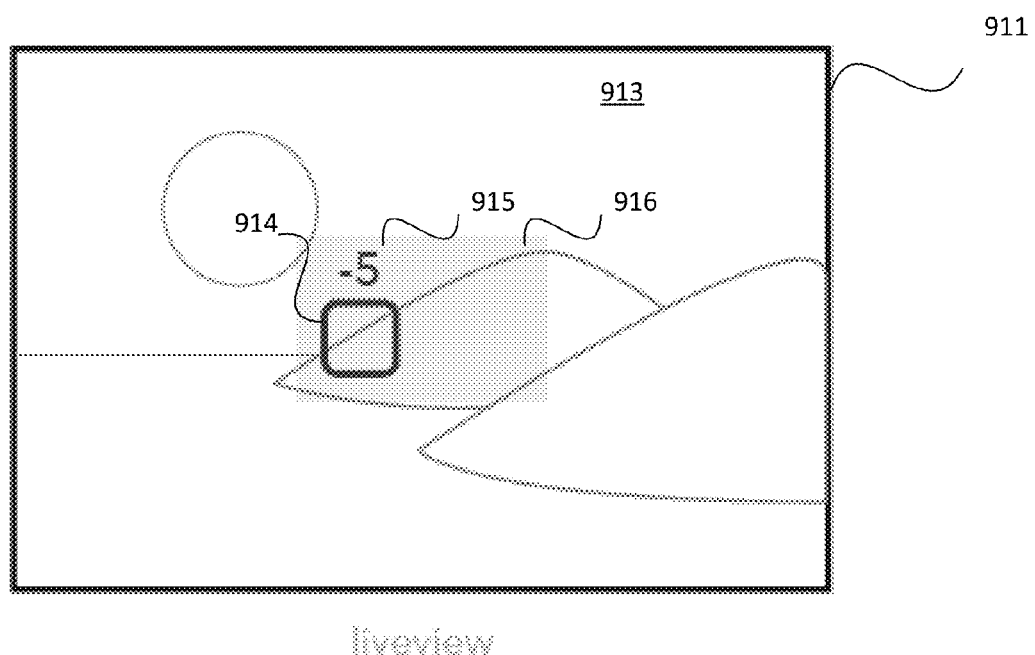
Figure 9C:
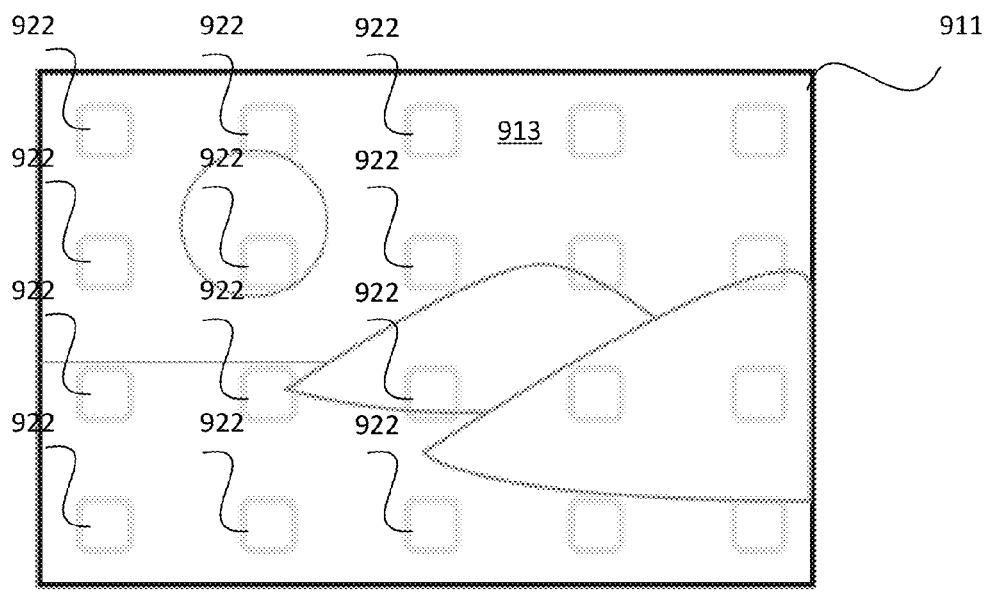
Figure 9C:
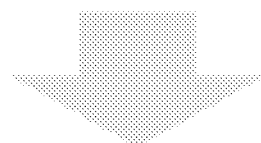
Figure 9C:
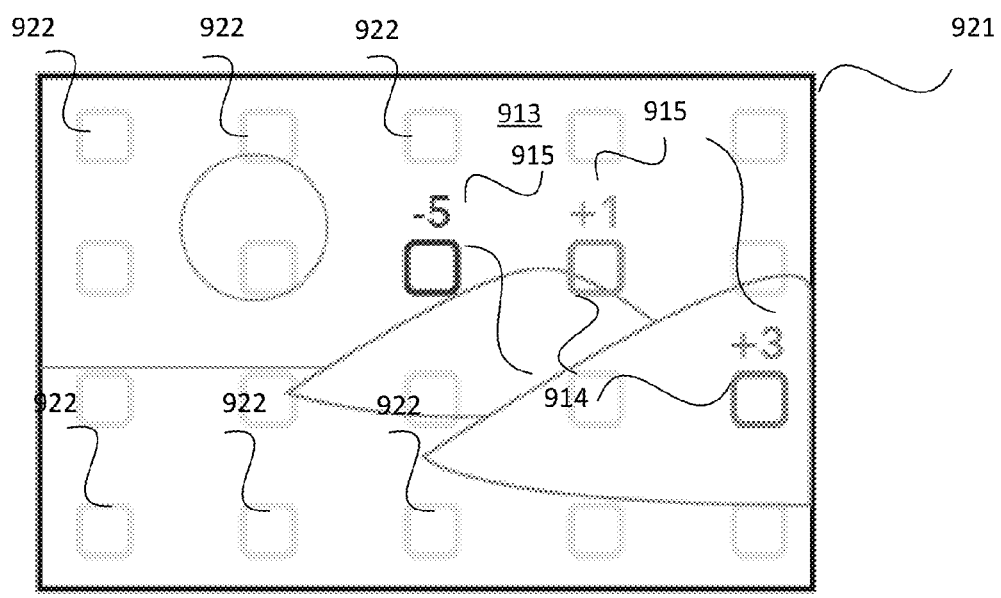

Referring now to FIGS. 9A through 9C, there are shown screen shots depicting examples of a user interface for providing information and feedback to aid a user in capturing light-field images.

FIG. 9A depicts an example in which the user can change modes from a live view 911 of scene 913 to a playback or still picture mode 912. In playback or still picture mode 912, information about scene 913 is presented as an overlay on scene 913 itself. In at least one embodiment, such information is presented as indicators 914 of different areas or features of scene 913 that have differing depths. Such indicators can be color coded and/or otherwise visually distinguished from one another, for example to denote different depths. In at least one embodiment, numeric indicators 915 can also be displayed, to indicate relative depth of the different areas or features of scene 913. In at least one embodiment, the information is presented for those features of scene 913 that are at a depth within the refocusable range of the image being captured.

FIG. 9B depicts an example in which information about scene 913 is presented during live view 911. Again, in at least one embodiment, such information is presented as indicators 914 (as well as numeric indicators 915) of different areas or features of scene 913 that have differing depths. In at least one embodiment, the information is presented for a subregion 916 of scene 913, for example that area located near the center of the frame. In at least one embodiment, subregion 916 is denoted, for example by shading.

FIG. 9C depicts an example in which a matrix-grid analysis is performed to determine depth information for various locations 922 within scene 913. During live view 911, the user can press a shutter button halfway down to cause information about to be presented scene 913 is presented, as shown in live view 921 as an overlay on scene 913 itself. Again, in at least one embodiment, such information is presented as indicators 914 (as well as numeric indicators 915) of different areas or features of scene 913 that have differing depths. In at least one embodiment, the information is presented for those locations 922 where some element of the scene is at a depth within the refocusable range of the image being captured.

In some embodiments, the present invention also relates to methods, systems, algorithms, designs, and user interfaces for controlling the optics of a light-field capture device to aid the user in successfully composing and capturing light-field data of a scene such that the light-field data may be used to generate 2D output images that encompass the scene objects of interest. For example, a set of generated 2D refocused images can be generated that contains 2D refocused images where the subject(s) of interest in the scene are sharp and appear "in focus".

The mechanisms employed by various embodiments of the present invention that relate to user aids for light-field capture may be categorized into the following broad groupings:

Processing light-field data read from sensor(s) 803 at video rates to display to the user a live-view image stream of processed 2D images, where the method for generating the 2D images is chosen to aid the user in composing a light-field capture of a scene and may be user-specified, automatically determined, or a combination of these.

Analyzing light-field data read from the light-field capture device's sensor(s) at video rates to convey to the user information about the scene being imaged and about the characteristics of the light-field data being captured, where such information may be communicated to the user by any suitable means supported by the device.

Analyzing the light field at non-video frame rates at the request of sensor 803. For example, in at least one embodiment, if the shutter button is held halfway down, the last frame shown is analyzed and light-field characteristics are displayed. Such information may include directions as to how to improve these characteristics; the information may be communicated by any suitable means supported by device 809.

Analyzing captured light fields and displaying light-field characteristics in playback mode. For example, device 809 can be configured to display light-field characteristics for captured light-field data after capture has occurred. In at least one embodiment, this playback mode can take place on a device other than light-field capture device 809. For example, the image data can be transferred to a computer, tablet, or phone, and the light-field characteristics can be displayed while image data is being played back on that device.

Controlling light-field capture device's 809 optical elements to aid the user in the composition and capture of light-field data.

These various techniques can be implemented using any suitable architecture, including for example those described herein in connection with FIGS. 1A and 2A to 2E. Each of these techniques is described in more detail below.

Processing Light-Field Data for 2D Live-View Image Display

According to various embodiments, the system and method of the present invention process captured live-view light-field data to produce 2D live-view image streams. These image streams can be displayed or output, for example on output device(s) 812 such as one or more screens on light-field capture device 809; alternatively, the image streams can be transferred and/or output over one or more external interfaces (such as, for example, transmission over HDMI to another display device).

Light-field data streams acquired by light-field sensor 803 may be processed in any of a number of different ways in order to generate 2D images. Various embodiments of the present inventions include methods, systems, and algorithms for processing data acquired at a video-rate (such as 30 frames per second) from light-field sensor 803 to generate one or more video-rate 2D image streams for display on light-field capture device 809 itself (such as on one or more LCD screens or other output device(s) 812) and/or outputting over external interfaces (such as HDMI ports). In particular, the 2D image stream may be used as a live-view image stream on the device's LCD screen, so that the 2D image stream displayed is generated in real-time from the light-field data being acquired. Each 2D image in the generated image stream(s) may feature one or more of the following aspects:

The 2D image may be refocused to a particular scene depth, and the scene depth to which it is refocused may be the same as or different from the scene depth which is optically in focus.

The 2D image may be refocused to an arbitrary focus surface, for example to simulate a tilt/shift lens.

The 2D image may be generated from a particular perspective view or parallax shift.

The 2D image may be all-in-focus or have extended depth of field (EDOF).

The 2D image may be stereo or otherwise rendered for 3D display/viewing, with a zero-parallax plane as one of the parameters of this rendering mode.

The 2D image may have been filtered or modified according to the depths of objects in the scene; exemplary embodiments of such filtering or modification are described below.

The 2D image may be generated from the acquired light-field data using any other method for producing a 2D image.

The 2D image may contain a plurality of image regions, each of which may feature one or more of these aspects.

In at least one embodiment, different 2D images in the generated image stream(s) may feature different aspects to one another. Specific techniques for generating 2D images having the above-listed characteristics are described in the above-cited related U.S. Patent Applications.

In at least one embodiment, the decisions as to what processing to apply to the light-field data stream to produce the 2D output image stream(s) are made automatically (and transparently to the user), as described in more detail herein. In at least one other embodiment, these decisions are made in conjunction with user input or direction. Exemplary embodiments of methods for making these decisions under the guidance or direction of the user include (but are not limited to) the following:

The user may indicate his or her subject or region of interest by providing input via input device(s) 811; this may include, for example, touching the screen or performing any other action(s) detectable by input device(s) 811. Input device(s) 811 may be of any suitable type, so as to enable techniques such as eye-tracking, stylus gesture input, voice commands, and/or the like. The light-field data is refocused to generate a 2D image stream that gives the appearance of bringing the corresponding subject or region (as designated by the user input) into focus.

The user may specify via touchscreen or other input that the light-field data should be refocused to a particular depth, for example the closest or furthest distance that can be brought sharply into focus, so as to generate a 2D image stream that gives the appearance of bringing that subject or region into focus.

In at least one embodiment, light-field capture device 809 includes an accelerometer or other movement-sensing component. The user may move, shake, or tilt light-field capture device 809 to cause it to generate a 2D image stream featuring perspective or parallax shifts or any other suitable effect(s).

The processing used to generate each image in the output 2D image stream may change over time, including on a per-frame basis. In at least one embodiment, the processing is gradually changed over time so that the 2D image stream appears to animate smoothly as different effects are rendered, without noticeable discontinuities in the characteristics of the image stream. Examples of such animations include (but are not limited to) the following:

Gradually changing the depth of the refocus operation, so that the 2D image stream appears to change its focus over time; this effect can give the appearance of physically changing the focus on a conventional 2D camera.

Gradually changing the perspective view or parallax shift over time so that the 2D image stream appears to change its viewpoint of the scene.

The parameters chosen for the generated 2D image stream animations may be chosen to be external, such that the resultant animations reflect the maximum capabilities of the acquired light-field data. For example, the animation may refocus between the closest and furthest scene depths which can be sharply brought into focus, or may shift the perspective center between the leftmost and rightmost virtual aperture positions. Such animations of the live-view image stream can convey information to the user about the capabilities of the light-field data being captured.

Implementation of Processing to Generate 2D Output Images from Light-Field Data

In various embodiments, any of a plurality of methods can be used for generating 2D output images from light-field data, including images featuring the effects enumerated herein, and any such method or combination of methods may be employed in conjunction with the techniques of the present invention to generate a 2D live-view image stream from captured live-view light-field data.

In particular, the techniques described herein can be used in connection with the methods described in related U.S. patent application Ser. No. 13/027,946, for 3D Light Field Cameras, Images and Files, and Methods of Using, Operating, Processing and Viewing Same, filed Feb. 10, 2010, the disclosure of which is incorporated herein by reference in its entirety, and related U.S. Utility application Ser. No. 13/774,971 for "Compensating for Variation in Microlens Position During Light-Field Image Processing,", filed Feb. 22, 2013, the disclosure of which is incorporated herein by reference in its entirety. Other approaches may also be employed, including those described in Ng et al. and other sources, based on "sub-aperture images."

Analyzing Light-Field Data and Communicating Scene and Light-Field Data Characteristics to the User In various embodiments, the system and method of the present invention include mechanisms for analyzing captured live-view light-field data, and then in real time communicating information about the light-field data characteristics and the scene being imaged to the user of light-field capture device 809.

Light-field data provides the capability for the determination of the depths of scene objects. In at least one embodiment, such depth analysis is performed on the captured live-view light-field data stream, at live-view/video rates; this depth information is then used to aid the user in composing and capturing light-field data.

For example, in at least one embodiment, the live-view 2D image stream that is displayed on output device(s) 812 can be modified to incorporate depth cues. This can be done, for example, by any of the following techniques:

- Overlaying a depth map on top of the live-view 2D image stream. The depth map may be semi-transparent and blended with the live-view images, or it may be opaque and replace them entirely
- Filtering the live-view 2D image stream such that each pixel is processed based on its depth and/or on the depth of its local region to change the brightness or color of the pixel in a depth-dependent manner. For example:
    - The intensity and/or color of pixels can be changed depending on whether the corresponding scene locations are within or not within the light-field data's refocusable range. For example, scene locations outside the range may be "grayed out".
    - The intensity or color of pixels corresponding to a particular scene depth can be changed. For example, colors can be changed for pixels corresponding to a scene depth which is currently being displayed as sharply in focus, or any other scene depth. These can be, presented, for example, as depth slices, isocontours, isosurfaces, or the like.
    - The intensity and/or color of pixels can be changed as a function of their depth relative to the scene depth which is currently being displayed as sharply in focus. For example, those pixels having a depth that is closer to the currently-sharp depth can be shown at a different intensity and/or color than those having depth that is farther away from the currently-sharp depth.
- Highlighting objects in the scene, adding a halo around/behind foreground objects, and the like.

Modifications to the live-view 2D image stream can be animated over time. For example, a particular depth slice can be highlighted in each 2D image frame (as described above); the depth which is highlighted can be changed on each subsequent frame. In general, any modifications that can be applied to a single frame may be animated over a series of frames by varying one or more parameters.

In at least one embodiment, text, graphics, icons, figures, and/or any other annotations or indicators are drawn on top of or alongside the live-view 2D image stream display, so as to communicate information about the scene or about the light-field data characteristics. Examples include:

- Labeling certain scene features with a numeric score or a text or graphic label, to indicate their relative depth in the scene. Any suitable label can be presented, so as to describe or indicate whether a given scene object is within the refocusable range of the light-field data.
- Presenting a "depth histogram" that classifies pixels in the scene according to their depths.
- Presenting a graph showing the output image resolution as a function of relative depth, with objects in the scene being indicated as marks on this graph.
- Tracking a feature or object within the scene, and continuously updating a label indicating its scene depth.
- Coupling face detection with depth analysis, for example by drawing rectangles around identified faces, and color-coding the rectangle according to scene depth.

In at least one embodiment, only portions of the light field display the visual cues described above. This allows for implementation on a device having limited processing power, where it might be unfeasible to process full-resolution images at video frame-rates. The portion of the image to be processed in this manner may be automatically determined by the camera or selected by the user.

In at least one embodiment, non-visual cues can be used to communicate depth and/or scene information to the user. For example a sound can be played, or device 809 can vibrate, based on the refocusable range of the captured light-field data.

Any or all of the above techniques can be activated on demand. For example, in at least one embodiment, the visual cues are shown when the user depresses a two-stage shutter button half-way; the live view is then altered as described above. Fully depressing the shutter button then captures and stores the light-field data. Other methods of toggling the visual cues on or off can be used, including those methods that incorporate other sensors on device 809, such as accelerometers, microphones, and/or other buttons.

Any of the above techniques can be performed on a captured light-field picture or video stream. In at least one embodiment, such techniques can be performed in a manner that displays more processing-intensive light field quality metrics that cannot be computed in real-time.

In at least one embodiment, the techniques described herein are applied to a display being presented on other devices than device 809, such as computers, tablets, or phones that receive image data from device 809.

Implementation of Depth Analysis Using Light-Field Data

Light-field data can be used to generate multiple different perspective views of the same scene (as described in Ng et al.); other methods may be known in the art for calculating depth information from perspective views of a scene. Any such method may be employed in conjunction with the present invention to use depth information to communicate scene information and/or light-field data characteristics to the user. In at least one embodiment, depth information is computed for every point in the scene; in another embodiment, it may only be computed within certain regions and/or for certain scene features.

Camera Control for Composition and Capture of Light-Field Data

In light-field capture devices 809 with movable optics, for example a main lens 813 with variable zoom and focus controlled by zoom and focus motors, the capabilities of the captured light-field data with respect to the set of 2D images of the scene that may be generated from it may be dependent in part upon the positions and/or configurations of the moving optical elements. For example, referring now to FIGS. 5A and 5B, there is shown an example of the relationship between the position of focal plane 504 (as determined by the focus position of main lens 813) and the refocusable range of the captured light-field data, according to one embodiment. "Refocusable range" refers to the range of scene depths which may be made to appear sharp and "in focus" in generated refocused 2D images for a particular device having particular parameters. This example may be applicable to an architecture such as that depicted in FIG. 2B, wherein the focus of main lens 813 may be varied.

Figure 5A:
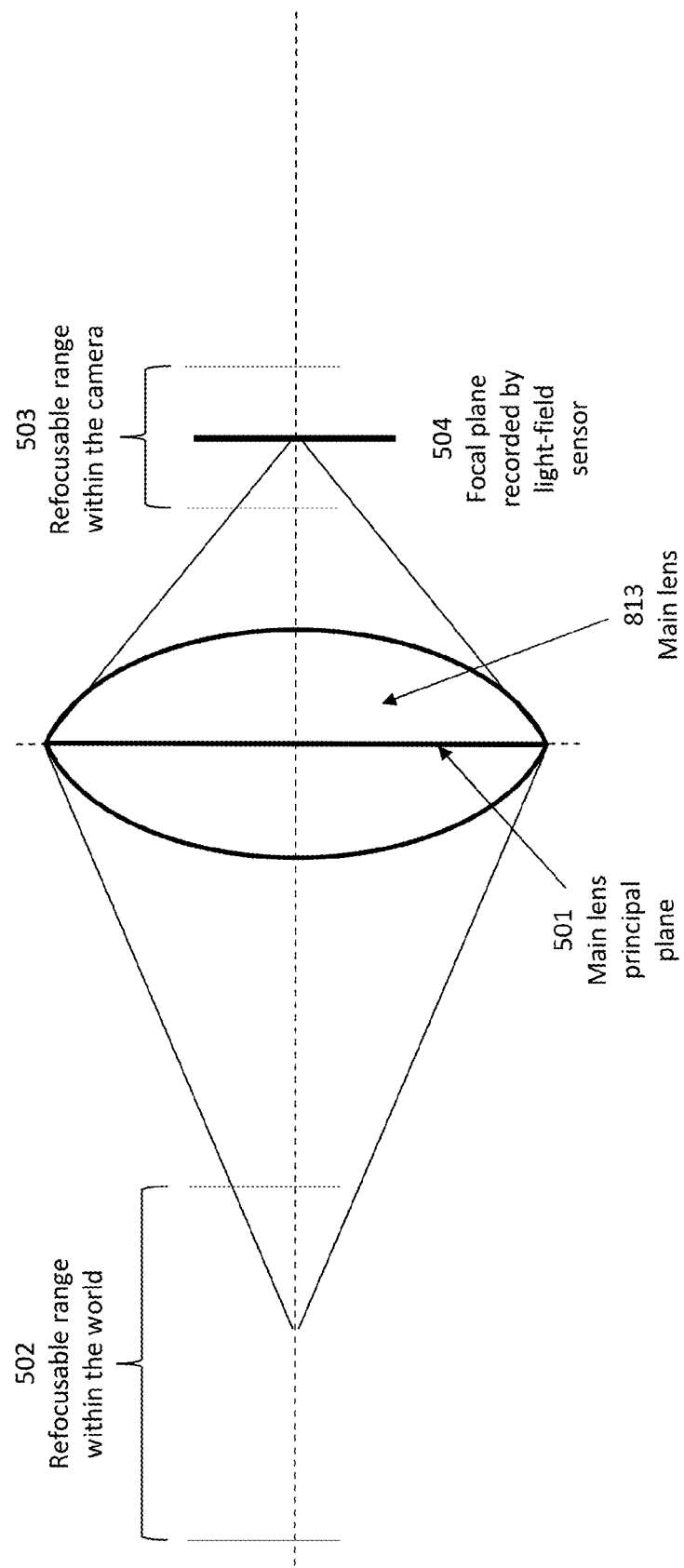
FIGS. 5A and 5B depict an example of the relationship between the position of the focal plane (as determined by the focus position of the main lens) and the refocusable range of the captured light-field data, according to one embodiment.
Figure 5B:
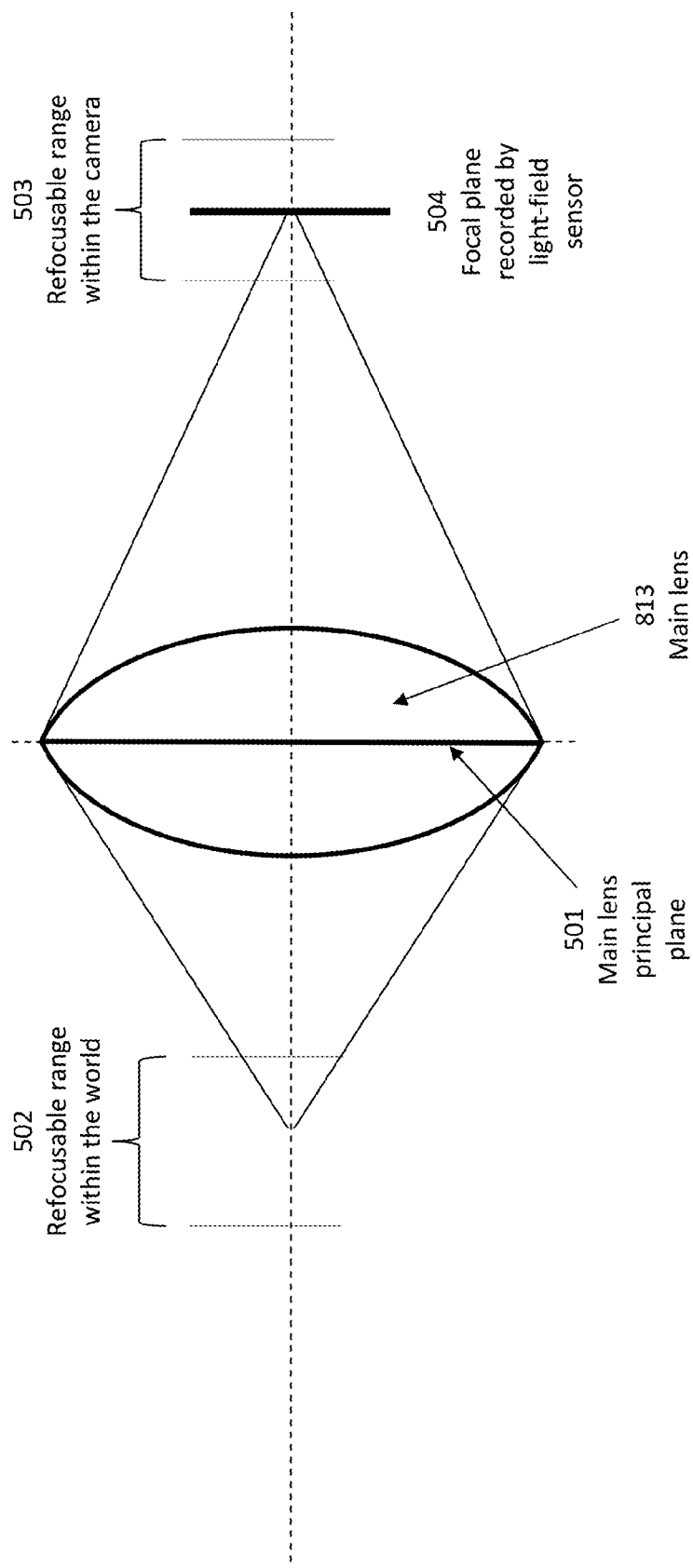

When focal plane 504 is moved inwards within the camera (i.e., closer to principal plane 501 of main lens 813), the refocusable range within the world 502 moves closer to the camera and also becomes narrower, changing which elements of the scene can be refocused to post-capture. FIGS. 5A and 5B illustrate the relationship between refocusable range within the world 502 and refocusable range within the camera 503.

Since the physical position and/or configuration of movable optical elements govern the capabilities of the captured light-field data, controlling these values is an important compositional element of using a light-field capture device 809. In particular, being able to select the position and/or configuration of movable optical elements to satisfactorily frame a given scene, including ensuring that the captured light-field data will enable one or more desired subjects in the scene to be refocused during a post-capture operation, is important to being able to successfully compose light-field data captures.

According to various embodiments of the present invention, any of a number of methods and systems can be implemented for controlling the position and/or configuration of movable optical elements in light-field capture device 809. For example, any or all of the following mechanisms can be used, singly or in any suitable combination:

Refocusable-to-infinity tracking: For any zoom position of device 809, the focus position of the optics can be set such that the captured light-field data permits refocusing out to optical infinity. By positioning refocusable range 502 such that a point within its refocusable range reaches optical infinity, light-field data captured at this lens configuration will be refocusable from infinity down to a minimum close distance. In one embodiment, optical infinity is set to the furthest point in refocusable range 502 in order to maximize the total depth of refocusable range 502. In another embodiment, optical infinity is set to a specific location within refocusable range 502.

Macro mode: For any zoom position of device 809, the focus position can be set to the furthest position such that a desired minimum close distance, for example the front surface of main lens 813, is within the refocusing range of the light-field data.

Tap-to-select-subject: The user may touch the screen during live-view to indicate a subject of interest, and the camera adjusts the focus position of lens 813 such that the specified subject is within the refocusable range of the captured light-field data. The refocusable range may be chosen (by choosing the focus position) in one of several ways (which may be selected via user preferences, or automatically by the camera), including for example:
Positioning the specified subject at the near or far extreme of the refocusable range.
Positioning the specified subject close to the middle of the refocusable range.

Subject tracking: Given an identified subject of interest (e.g. by the user tapping the screen), subsequent zoom position changes may be made by the user while keeping the desired subject within the refocusable range, and in particular, while keeping the same subject in focus throughout the zoom position changes, by changing the focus position appropriately in tandem with changes to the zoom position.

Multi-subject bracketing: The user may identify a plurality of scene subjects, for example by touching the screen in multiple locations, and the camera automatically adjusts the movable optical elements in order to ensure that all desired subjects are within the refocusable range of captured light-field data. Such adjustments may include:
Changing the focus position to best bracket all selected scene subjects within the refocusable range.
Changing both the zoom and focus positions to best attempt to bracket all selected scene subjects within the refocusable range. Note that by changing the zoom position, the field of view and depth of field of the scene are changed, and the camera may employ heuristics to choose the best zoom and focus positions such as the following:
Zoom in as far as possible such that (1) all specified subjects of interest are within the field of view and (2) the focus position may be set such that all subjects of interest are within the refocusable range.
Zoom out only to the extent needed to allow the focus position to be set such that all specified subjects of interest are within the refocusable range.

Automatic scene bracketing: The camera analyzes the scene and automatically determines which focus position would result in the contents of the entire scene, or the contents of selected regions of the scene (e.g. a center rectangle), being best bracketed by the refocusable range of captured light-field data.

Automatic face bracketing: The camera analyzes the scene and detect human faces, and then automatically chooses the zoom and/or focus position such that one or more faces are placed within the refocusable range of the light-field data. The choice of which faces to bracket may be made in any of a number of ways, including (but not limited to) the following:
Bracket faces of people that are friends or acquaintances of the user.
Bracket faces that are in the foreground, where the foreground may be defined as scene depths that are not close to optical infinity.
Bracket faces that are near the center of the image.
Bracket faces that are large or prominently featured in the scene.

Balancing live-view optical focusing and software refocusing: The subject of the scene that appears in focus in a live-view image stream is a product of two variables: which scene depth is optically in focus when capturing the light-field data, and which scene depth is subsequently refocused to by using the light-field data. The user may interact with the camera, for example by tapping the screen, to specify what subject should be in focus in the live-view image stream, and the camera may control the optical focus position and the refocusing depth as coupled variables to keep the subject visually in focus on the screen. Given this coupling, the camera may employ the following (or any other) strategies to control the focus position of the captured light-field data:

- Optically focus the camera such that the visually in-focus subject is at the near or far extreme of the refocusing range.
- Optically focus the camera such that the visually in-focus subject is somewhat close to the center of the refocusing range.

In any or all of the above mechanisms that refer to a "subject" in the scene, for example a mechanism whereby the user specifies a subject of interest by tapping the screen and then this subject is kept sharp and in-focus while the camera's zoom position is varied, any of the following mechanisms can be used:

- Specification of the subject is interpreted as a one-time specification of a camera-relative depth value. Subsequent changes to the camera's position, orientation, focus, or zoom have no effect on the retained depth value. In this embodiment, "tracking the subject" means making adjustments that are consistent with the retained depth value. For example, when the camera changes the lens' focus position to "track a subject" and to keep it appearing sharp and in focus on the display as the user is changing the zoom position, in this embodiment, the camera acts to keep the specified or determined depth in focus.
- Specification of the subject is interpreted as a one-time specification of a spatial coordinate either in the camera's field of view or on the camera's screen. Analyses performed over time on live-view frames are performed by the camera at this spatial coordinate, regardless of whether the contents of the scene are changing. In the case of the coordinate referring to a position in the camera's field of view, as the camera changes its zoom position and hence changes the imaged field of view, the coordinate is updated accordingly.
- The "subject" is interpreted by the camera as an object in the scene, for example any scene feature such as a human face, and the camera tracks the subject even as it moves within the scene, rather than just using its scene depth at the time that the subject was specified or determined.

Implementation of Subject Depth Determination from Light-Field Data

In one embodiment, depth information for a particular scene subject or location may be computed from light-field data using the method described herein.

Implementation of Lens Zoom and Focus Position Determinations for Desired Refocusable Ranges in Captured Light-Field Data In one embodiment, given a particular zoom position and a desired refocusable range in the scene, the system of the present invention automatically determines an appropriate lens focus position for capturing light-field data that can be used to generate 2D images spanning (or attempting to span) that refocusable range. If the desired refocusable range exceeds the range that is possible to capture given the particular light-field capture device being used, then in one embodiment, a range is chosen that is somewhat centered within the desired range.

Figure 6:
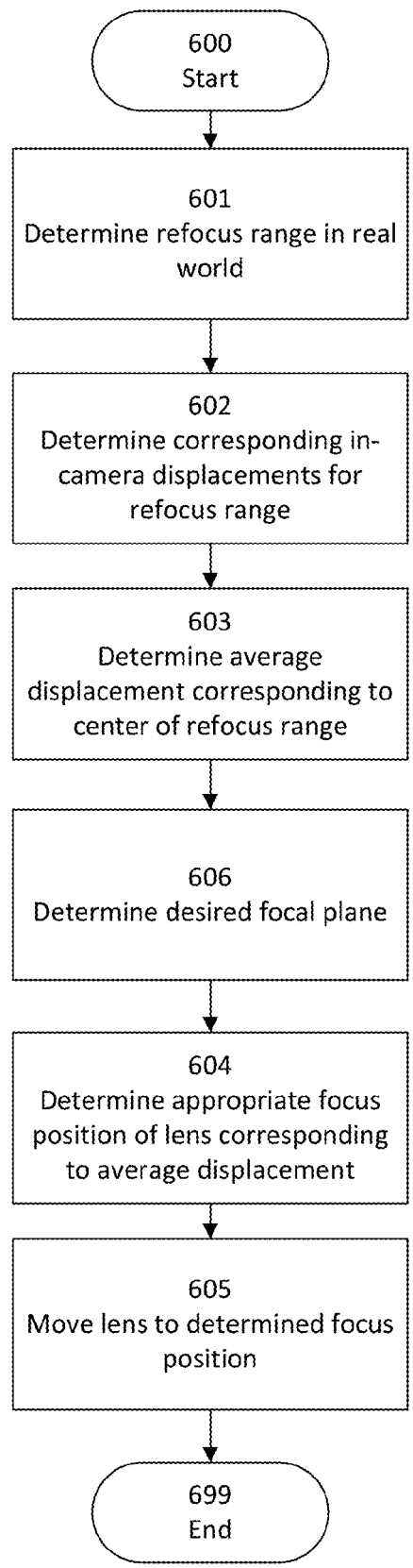
FIG. 6 is a flow diagram depicting a method for automatically moving a lens to a focus position for capturing a particular refocus range, according to one embodiment.

Referring now to FIG. 6, there is shown a flow diagram depicting a method for automatically moving a lens to a focus position for capturing a particular refocus range, according to one embodiment. The desired real-world refocus range is determined 601, either automatically based on depth positions of objects in the scene, or based on user input or device settings, or by some other mechanism. Based on the real-world refocus range, corresponding in-camera displacements are determined 602. This can be expressed, for example, as millimeter displacements of light-field sensor's 806 position within the camera. For example, if the desired refocusable range is expressed in terms of real world distances, then a thin lens equation may be employed to determine the corresponding range limits as in-camera displacements. For example, if the distances from the object to the lens and from the lens to the image are $S_1$ and $S_2$ respectively, for a lens of negligible thickness, in air, the distances are related by the following thin lens equation:

$$\frac{1}{S_1} + \frac{1}{S_2} = \frac{1}{f} \qquad \text{(Eq. 1)}$$

The system then determines 603 the average of the near and far sensor displacements to determine 606 the desired focal plane that will center the refocusable range of the captured light-field data on the center of the desired refocusable range. Using a known correspondence between the focus positions of the lens and focal plane distances, for example as is supplied by the lens manufacturer, the appropriate focus position of the lens is determined 604, and the lens is automatically moved 605 to the determined focus position.

Figure 7:
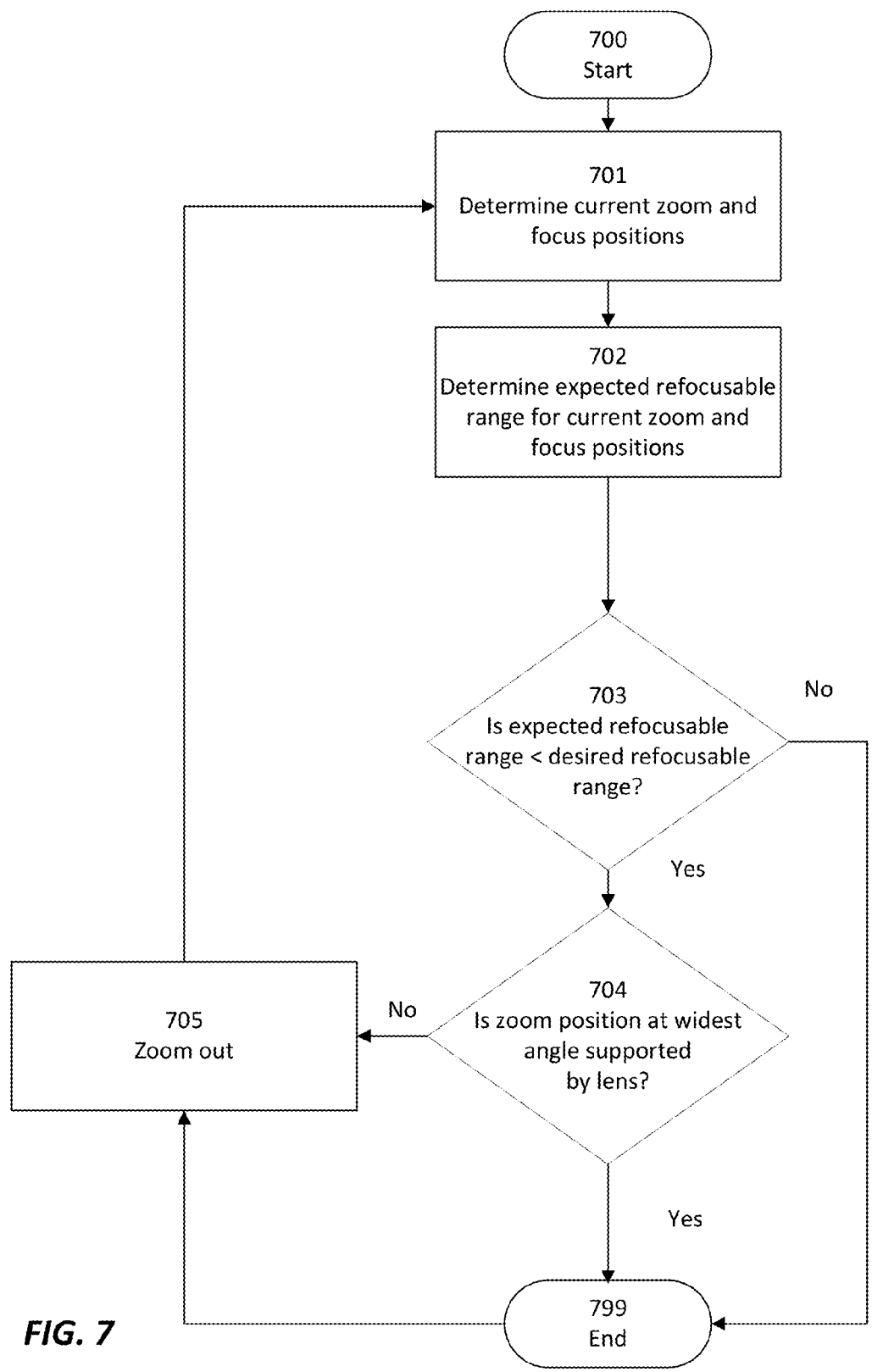
FIG. 7 is a flow diagram depicting a method for automatically adjusting zoom position to provide a desired refocusable range, according to one embodiment.

In at least one embodiment, if the zoom position is also a free variable and the goal is to capture the entire desired refocusable range, then zoom position can be automatically adjusted to optimize the refocusable range. Referring now to FIG. 7, there is shown a flow diagram depicting a method for automatically adjusting zoom position to perform such optimization.

The system determined 701 the current zoom position and the focus position of the camera. From this information, it determines 702 the expected refocusable range of captured light-field data at that (zoom, focus) position pair. The system then determines 703 whether this refocusable range is less than the desired refocusable range. If not, the method ends 799.

If, in step 703, the refocusable range is less than the desired refocusable range, then the system zooms out the lens, if possible. This is done by determining 704 whether the zoom position is already at the widest angle supported by lens 813. If not, a zoom-out operation is performed 705, and the system repeats steps 701 through 704. Zooming out 705 causes lens 813 to have a wider angle (shorter focal length), making it possible that the expected refocusable range is now within the desired range. If not, the steps can be repeated until either the expected refocusable range of the light-field data matches or exceeds the desired refocusable range, or the zoom position is at the widest angle supported by lens 813.

In at least one embodiment, if the determined in-camera displacements exceed the operational parameters of the lens assembly, the camera can automatically perform a zoom-in operation to increase the focal length and thereby decrease the range of the in-camera displacements needed to cover the real-world refocus range. Such automatic zooming is optional, and can be subject to user settings or approval.

Implementation of Face Detection and Analysis in Light-Field Data

In at least one embodiment, face detection and analysis of light-field data may be performed by first generating a 2D image from the light-field data, for example an all-in-focus or extended depth of field (EDOF) image. Any known method(s) can then be used for face detection and analysis of the 2D image. The 2D image can be generated using techniques described above and in the above-cited related patent applications.

Once a face or other object has been detected in a scene, the depth of the face or other object may be determined using any suitable method for determining scene or object depth in light-field data, for example using techniques described above and in the above-cited related patent applications.

Camera Control for Composition and Capture of Light-Field Data without Requiring Light-Field-Specific Processing In some embodiments, in addition to mechanisms for making use of light-field processing to enable the user to capture light-field data such that a desired subject is within the refocusable range of such data, the system and method of the present invention can use techniques that do not require any light-field-specific computations. Such embodiments may be useful on light-field capture devices which do not feature the capability to perform light-field processing in real-time at video rates on the captured live-view light-field data.

Figure 8A:
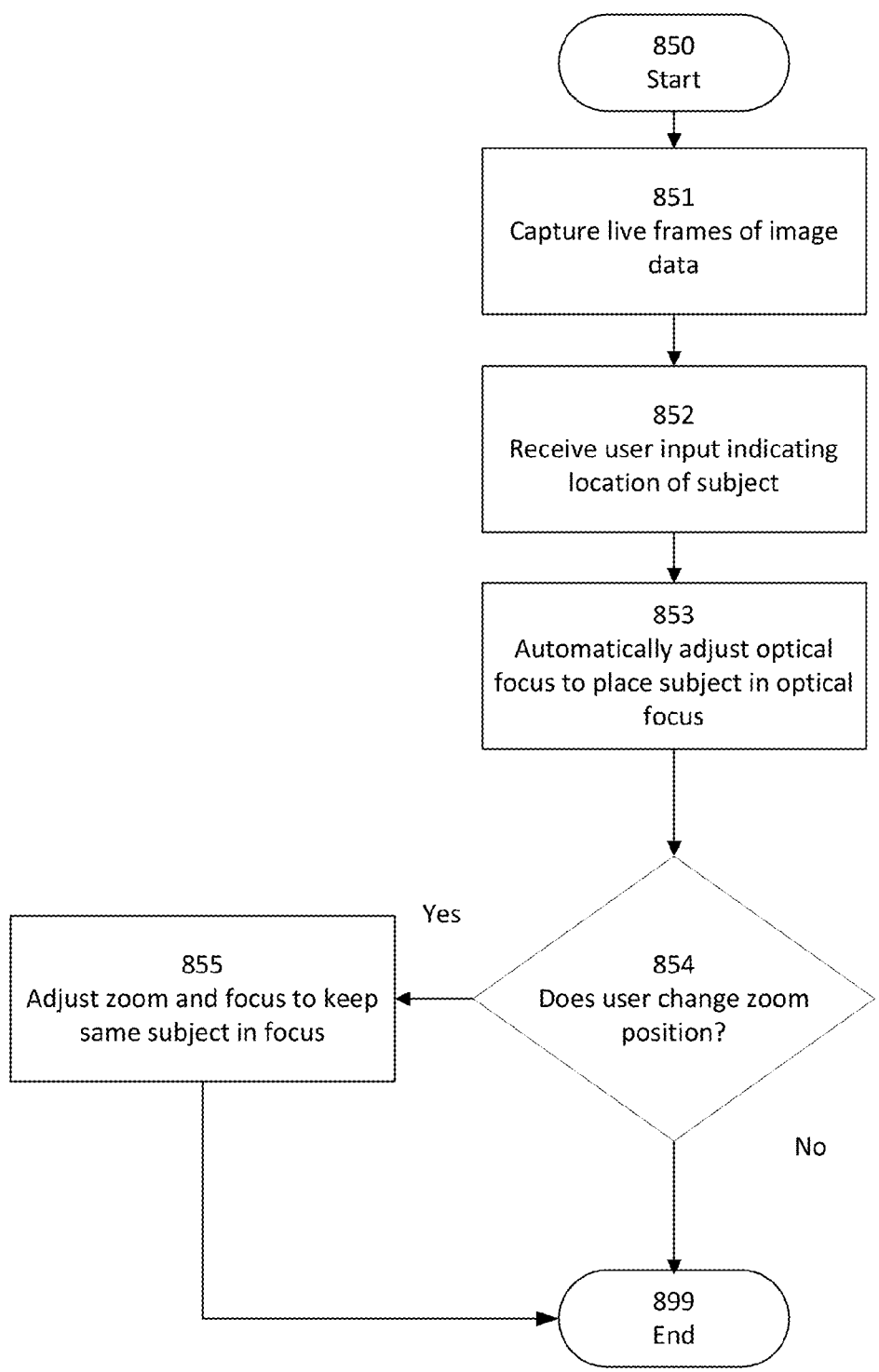
FIG. 8A is a flow diagram depicting a method for using light-field data for real-time focusing, according to one embodiment.

Referring now to FIG. 8A, there is shown a flow diagram depicting an example of a method for using light-field processing in such a manner, specifically to use light-field data for real-time focusing. During a live-view operation, while captured live frames are continuously streamed 851 to the camera display, the user may provide input 852 indicating a location of a subject of interest within the framed scene. For example, the user may touch the screen or otherwise indicate to the camera the location of the subject of interest. The camera may then physically adjust 853 its optical focus so that the subject selected by the user is in optical focus on image sensor 806.

In at least one embodiment, the camera may provide output to communicate to the user that such focusing is taking place, and/or can provide additional output when the focusing operation is complete; such output can be visual (for example via the camera's display and/or LED indicators), auditory (for example by beeps), and/or haptic. In at least one embodiment, the user can interrupt and/or cancel such automatic focusing at any time by pressing the shutter button; this causes the camera to take a picture with the optical focus in whatever state it was when the shutter button was pressed.

In at least one embodiment, if the user changes 854 the zoom position (or other setting) of the camera after it has been optically focused 853 on a subject, the camera automatically adjusts 855 zoom and/or focus settings to keep the same subject in focus despite the changing focal length. This may be accomplished, for example, by determining the current image plane distance from the focus group position in lens 813, and the current focal length from the zoom group position in lens 813. From those two values, an object plane distance in the world can be computed. When a new zoom position is set, a new image plane distance can be computed based on the object plane distance and new focal length. The new image plane distance may be converted to a focus group position and a new optical focus may be set to keep the subject in focus.

Figure 8B:
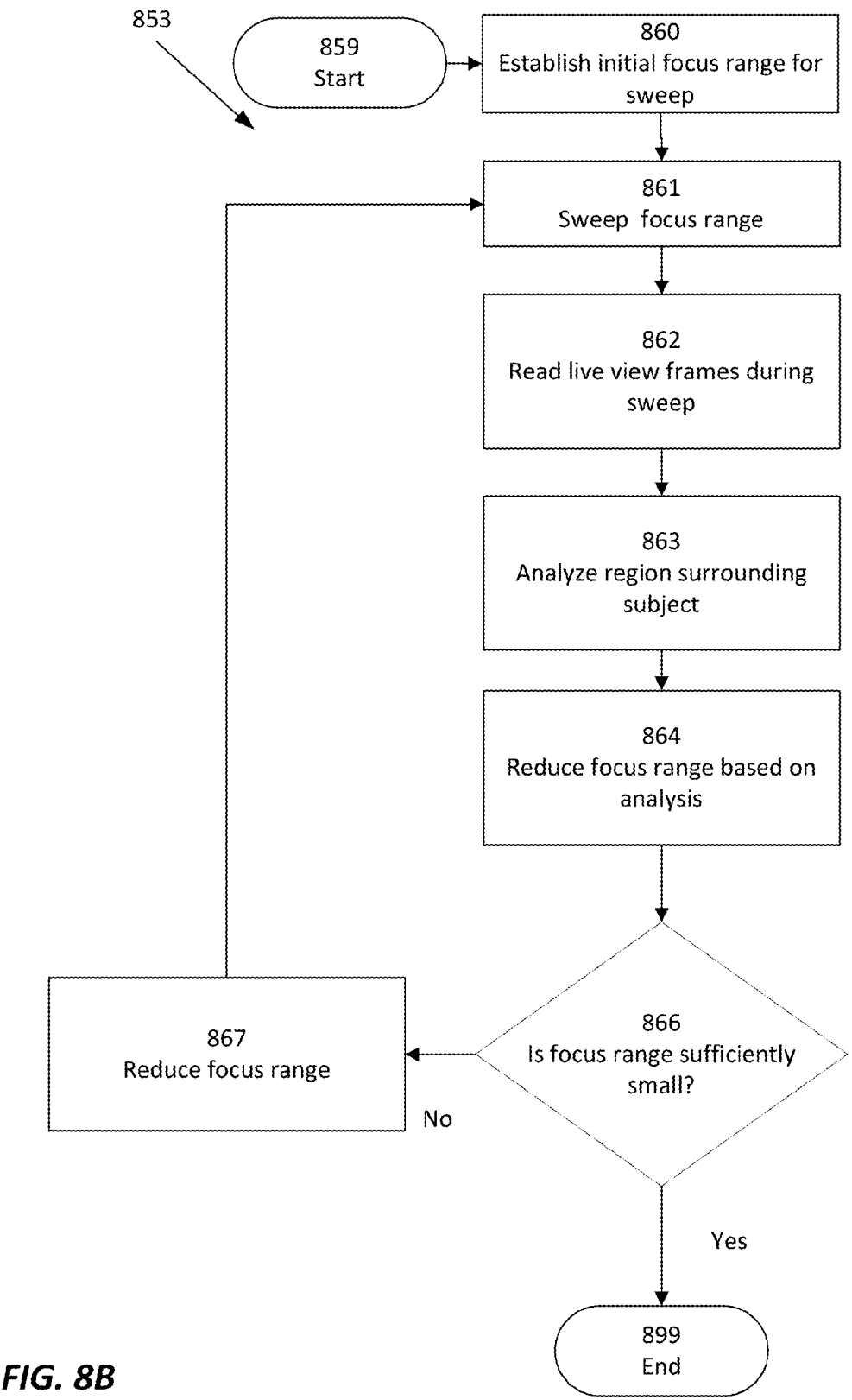
FIG. 8B is a flow diagram depicting a method for successively reducing focus range based on analysis of light-field data, according to one embodiment.

Referring now to FIG. 8B, there is shown a flow diagram depicting a method for automatic optical focusing 853 by successively reducing focus range based on analysis of light-field data, according to one embodiment. An initial focus range for a focus sweep is established 860; for example, this initial focus range can be the entire usable focus range of lens 813. The camera then sweeps 861 through the focus range, for example by moving the focus motor of lens 813, possibly in fixed amounts, through the focus range. Live view frames are read 862 during the sweep; for example, after each step, a live view frame is read out and a region surrounding the specified subject of interest is analyzed 863. Based on this analysis 863, the focus range is reduced 864 to more closely specify a range surrounding optimal focus.

Steps 861 through 864 can be performed one or more times, each time reducing the total optical focus range swept as well as the degree to which optical focus is changed per live view frame analyzed. In at least one embodiment, the start and stop positions of each sweep depend on the results of the previous sweep. The number of sweeps may be determined by optimizing for the minimum time required to achieve a desired precision. In at least one embodiment, the system determines 866 if the focus range is sufficiently small; if not, it reduces 867 the focus range and repeats steps 861 to 864.

Figure 8C:
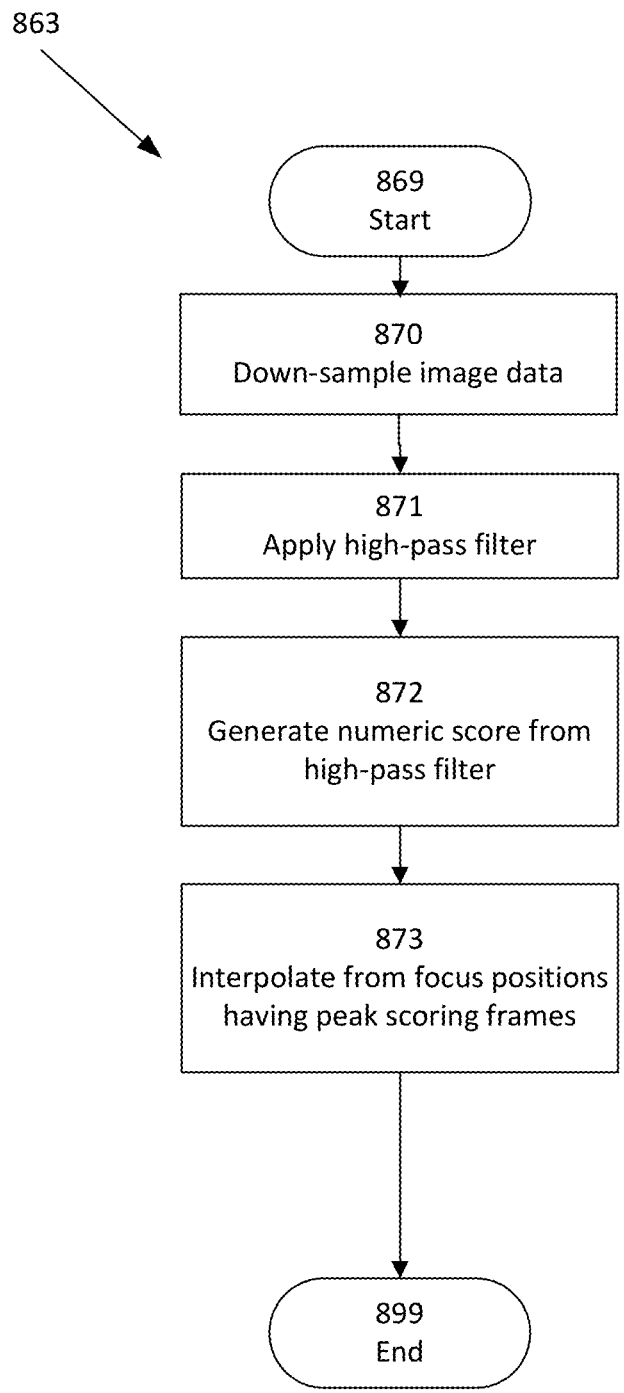
FIG. 8C is a flow diagram depicting a method for analyzing a region of a frame for automatic focusing, according to one embodiment.

Referring now to FIG. 8C, there is shown a flow diagram depicting a method for performing analysis step 863 for automatic focusing, according to one embodiment. The image data is down-sampled 870 to increase the signal-to-noise ratio. The image is then filtered 871 using a high-pass filter. A numeric score is generated 872 from the results of the high-pass filter; this score represents how much in-focus information is contained in the region surrounding the subject. The focus position corresponding to best optical focus is then determined, for example by interpolating 873 from focus positions corresponding to peak scoring frames based on their scores.

In at least one embodiment, down-sampling 870 and filtering 871 may be performed on one or more color channels of the live-view image, for example the green channel. In at least one embodiment, a convolution box filter may first be applied to the analysis region, and the result may be sub-sampled to produce a smaller single-channel version of the analysis region. To produce the high-pass filtered version of this smaller image, the following filter (Sum-Modified-Laplacian) may be applied:

$$f(x,y)=|2p(x,y)-p(x,y-s)-p(x,y+s)|+|2p(x,y)-p(x-s,y)-p(x+s,y)| \quad \text{(Eq. 2)}$$

where p(x,y) is the pixel value at coordinates x and y, s is the filter "step", and f(x,y) is the resulting filtered pixel value. The numeric focus score may be generated by computing:

$$\sum_{x,y} f(x, y) \quad \text{(Eq. 3)}$$

In at least one embodiment, if during a sweep 861, the above-described analysis indicates that numeric scores were sharply increasing and then began to sharply decrease, the sweep can be interrupted early based on detection that the local numerical derivative of focus scores exceeds a certain threshold.

Presenting a Light-Field Capture Device as a 2D Camera

Many mobile devices support the capability to run software applications ("apps") that are able to collect images from cameras on the devices, both for live-view and video streams and also for still captures. Such applications include native iOS and Android camera applications, in addition to third-party applications including Instagram, Hipstamatic, and many others. Devices that run such applications include, for example, Apple's iPhone and iPad, and Google's Android devices, In general, light-field capture devices record light-field data rather than standard 2D data. In some situations, a mobile device which is also a light-field capture device may be able to run applications that are compatible with a standard 2D camera, but are not able to operate with light-field data. In at least one embodiment, the system of the present invention processes acquired light-field data to generate 2D images for use with apps. Such processing may be performed using techniques described above and in the above-cited related patent applications.

In at least one embodiment, the system and method of the present invention include functionality for enabling photographic and imaging software that runs on devices with standard 2D cameras to also transparently run on light-field capture devices. In particular, such embodiments can integrate the processing of light-field data into the camera software of mobile devices in such a way that the standard interfaces and APIs exposed to applications running on the device operate in the manner expected for a device with only standard 2D cameras.

Figure 3A:
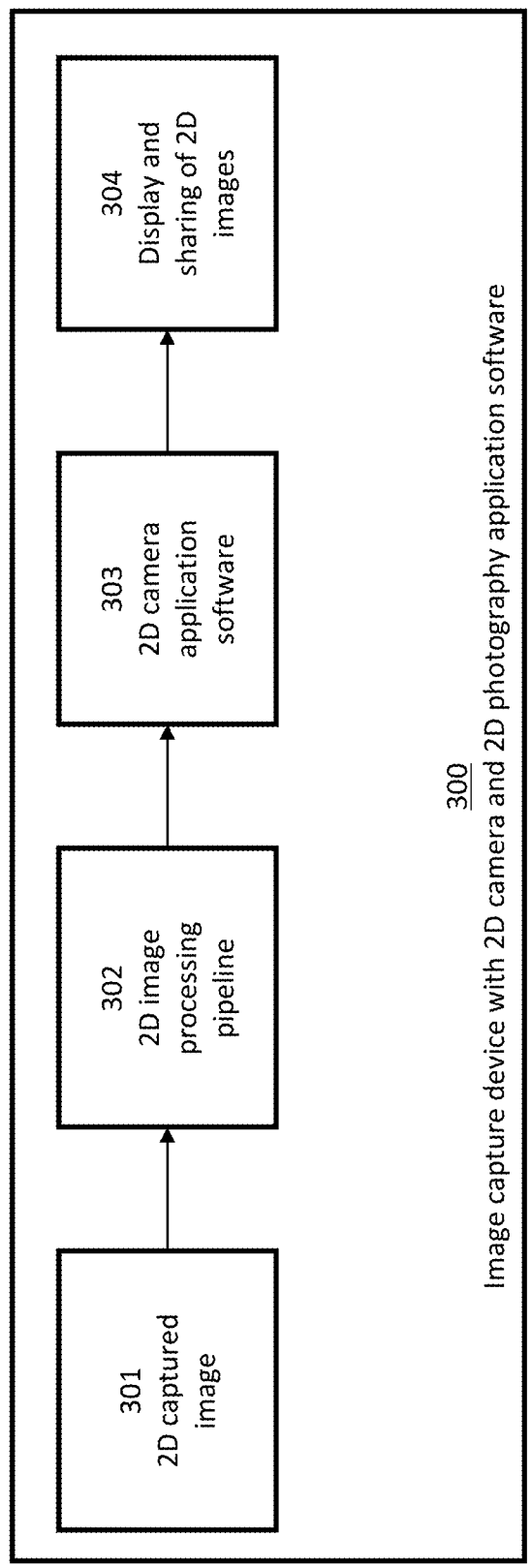
FIG. 3A depicts an example of a 2D image capture device in which acquired 2D sensor images are processed by a 2D image pipeline and passed to application software running on the device, according to one embodiment.

Referring now to FIG. 3A, there is shown an example of a 2D image capture device 300 in which acquired 2D sensor images 301 are processed by 2D image pipeline 302 and passed to application software 303 running on device 300, according to one embodiment. Application software 303 may perform any desired operations 304 on the 2D images, including for example, further processing, displaying, sharing, transferring, posting, and/or storing the images.

Figure 3B:
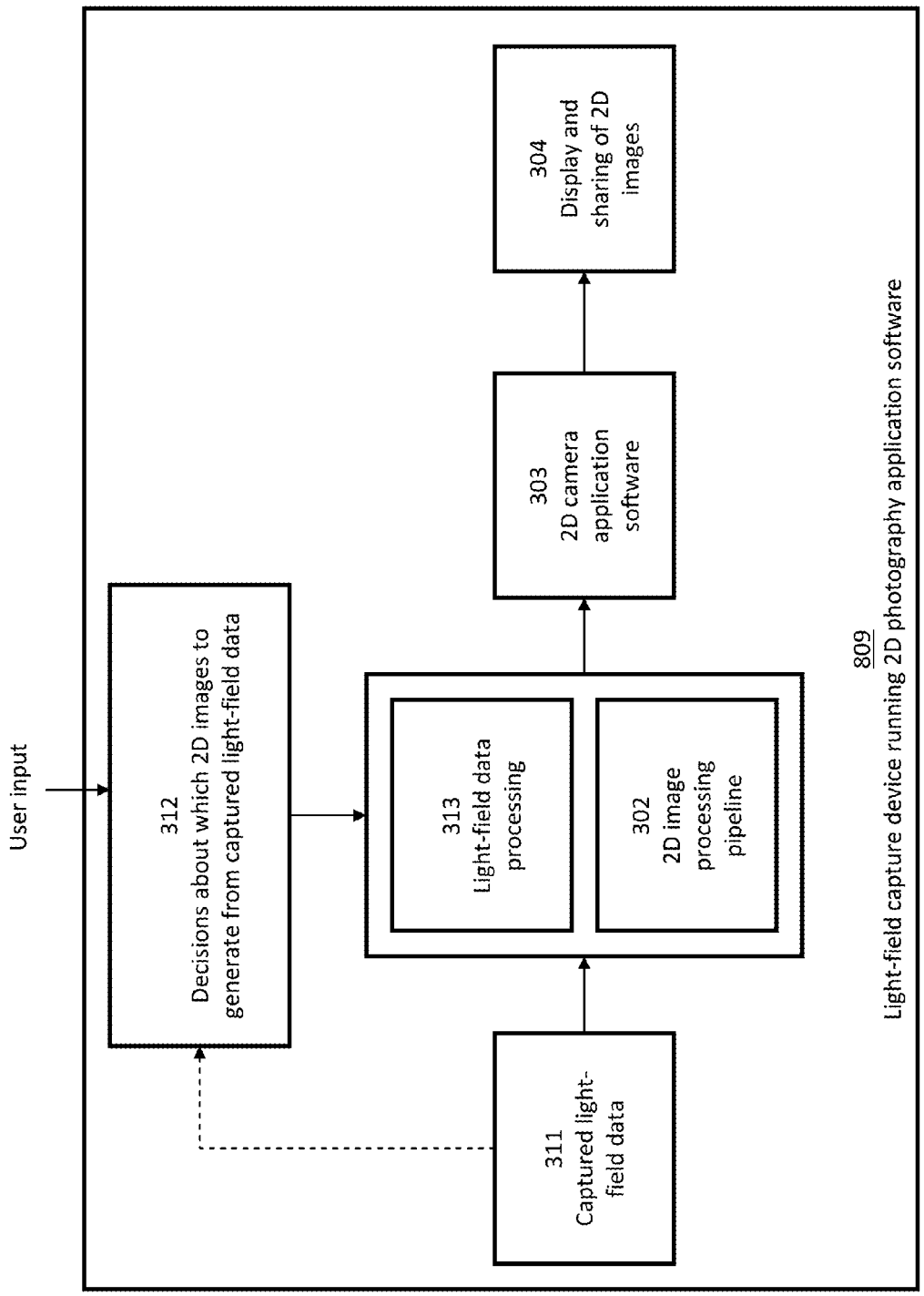
FIG. 3B depicts a light-field capture device using both 2D image processing and light-field processing to generate 2D output images from acquired light-field data, and to present such images in a format compatible with application software, according to one embodiment.

Referring now to FIG. 3B, there is shown an example 3B of a light-field capture device 809 using both 2D image processing and light-field processing to generate 2D output images from acquired light-field data, and to present such images in a format compatible with application software, according to one embodiment. The same 2D camera application software 303 runs on device 809. Here, however, the image data is light-field data 311. Accordingly, device 809 makes decisions 312 as to which 2D images should be generated from captured light-field data 311. Such decisions can be made based on any suitable factors. Light-field processing 313, as described above and in related cross-referenced applications, is performed in connection with 2d image processing pipeline 302 to generate 2D output images from the acquired light-field data and present them in a format that is readable by application software 303. Application software 303 may perform any desired operations 304 on the 2D images, including for example, further processing, displaying, sharing, transferring, posting, and/or storing the images. Both live-view/video and still captures are supported by this technique.

In at least one embodiment, directions may be provided to light-field data processing 313 to specify which 2D images to generate from light-field data 311. Such directions may be based on user input and/or on automated analysis.

Figure 4:
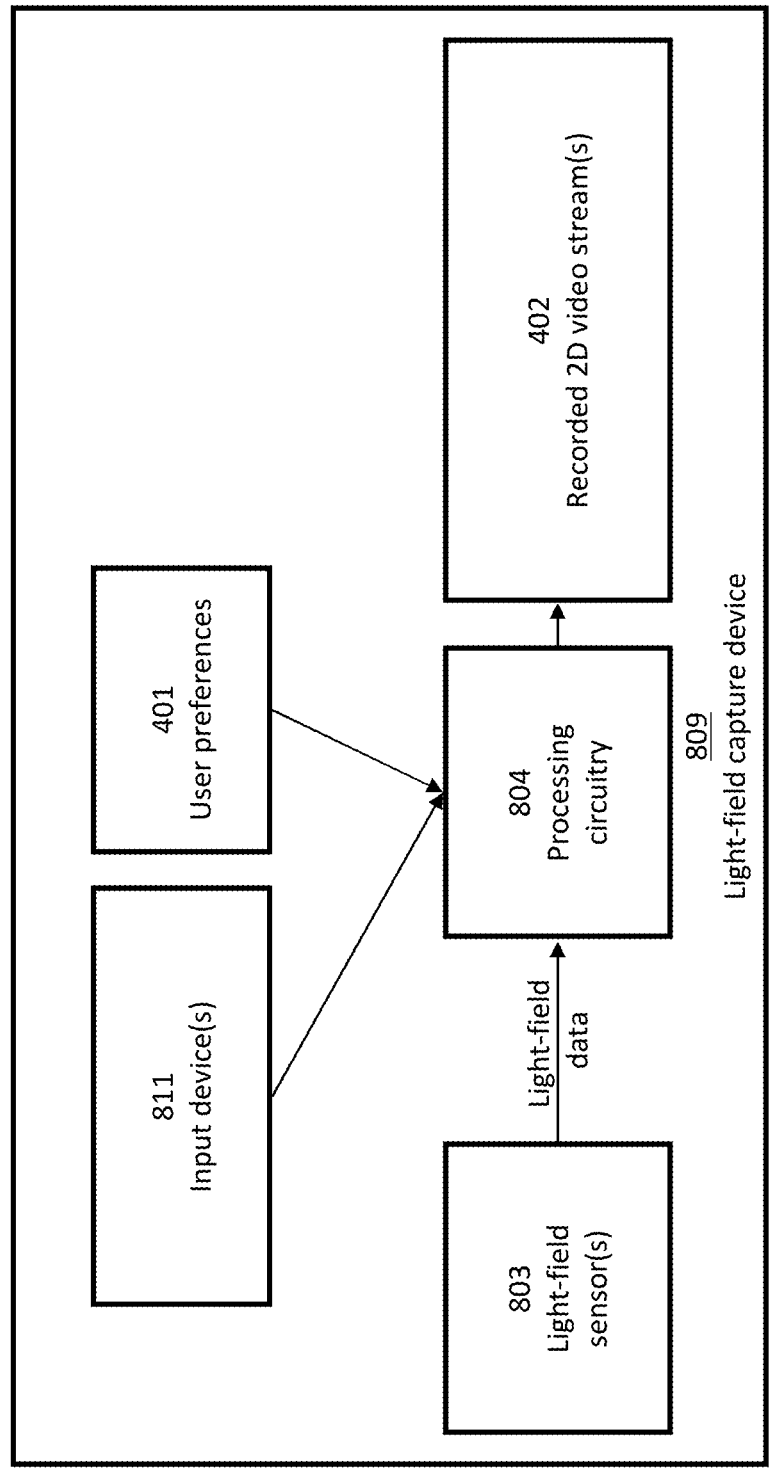
FIG. 4 depicts an example of an architecture for generating and recording a plurality of 2D video streams from light-field data on a light-field capture device, according to one embodiment.

Generating a Plurality of Processed 2D Video Streams from a Light-Field Capture Device In at least one embodiment, the system and method of the present invention can generate and record a plurality of 2D video streams from light-field data on a light-field capture device. Referring now to FIG. 4, there is shown an example of an architecture for generating and recording a plurality of 2D video streams in this manner.

In at least one embodiment, processing circuitry 804 operates on light-field data received from light-field sensor(s) 803, to generate any suitable number of 2D video stream(s) 402. User input, provided via any suitable user input device(s) 811 such as a touchscreen, buttons, and/or the like, can be used to control or affect the operation of processing circuitry 804. In at least one embodiment, user preferences 401 may also be used, as specified by the user in a preferences screen, or as provided based on defaults.

In various embodiments, processing circuitry 804 can use any suitable method of generating 2D images from light-field data, including (but not limited to) those described above and in related cross-referenced applications. These techniques generate a live-view 2D output image stream, and can therefore be employed for generating and recording one or more 2D video stream(s) 402, where each generated stream may be generated using different methods and/or parameters.

In at least one embodiment, for each output 2D video stream 402, the decision about what processing to apply to the captured light-field data to produce each output 2D image may be made automatically (for example based on user preferences 401 and/or other factors) and/or may be made according to directions given by the user and detected at user input device 811. More specifically, user preferences 401 may include any settings or preferences that may be set prior to video recording and that may specify, for example, the number of output 2D video streams 402 along with the methods used to generate them. For example, the user may specify that one output stream 402 should be refocused such that infinity is made sharply in focus, a second output video stream is all-in-focus, and a third output video stream is all-in-focus and also in stereo 3D for viewing on a 3D TV or similar 3D display.

Any suitable user input can be provided to user input device 811. In at least one embodiment, the user input may specify the number of output 2D video streams along with the methods used to generate them. For example, the user may touch the screen at a plurality of locations to specify objects that should be tracked, and a separate 2D video stream may be generated and recorded for each tracked object in which it appears sharp and in focus.

In various embodiments, the light-field data itself may or may not be recorded in addition to the generated 2D video streams 402.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. In a light-field image capture device, a method for providing feedback to a user in connection with light-field image capture, comprising:

capturing light-field data representing a scene;

concurrently with the capture of the light-field data, performing the steps of:

processing the captured light-field data to generate a two-dimensional video stream representing a live view of the scene;

displaying the two-dimensional video stream on a display device; and concurrently with the display of the live view, outputting an indication of at least one light-field characteristic of the captured light-field data corresponding to the displayed live view.

2. The method of claim 1, wherein outputting an indication of at least one light-field characteristic comprises outputting an indication of a degree of suitability of the captured light-field data to generate two-dimensional images having at least one desired characteristic.

3. The method of claim 2, wherein the at least one desired characteristic comprises at least one selected from the group consisting of:
- a particular refocus range;
- a particular parallax shift range;
- a particular perspective shift range; and
- a particular stereo disparity metric.

4. The method of claim 1, wherein processing the captured light-field data to generate a two-dimensional video stream comprises generating a series of two-dimensional images refocused to a particular scene depth.

5. The method of claim 1, wherein processing the captured light-field data to generate a two-dimensional video stream comprises generating a series of two-dimensional images having different refocus depths from one another.

6. The method of claim 1, wherein processing the captured light-field data to generate a two-dimensional video stream comprises generating a series of two-dimensional images from a particular perspective view.

7. The method of claim 1, wherein processing the captured light-field data to generate a two-dimensional video stream comprises generating a series of two-dimensional images having different perspective views from one another.

8. The method of claim 1, wherein processing the captured light-field data to generate a two-dimensional video stream comprises generating a series of two-dimensional images having a particular parallax shift.

9. The method of claim 1, wherein processing the captured light-field data to generate a two-dimensional video stream comprises generating a series of two-dimensional images having different parallax shifts from one another.

10. The method of claim 1, wherein processing the captured light-field data to generate a two-dimensional video stream comprises generating a series of two-dimensional images that are modified according to depths of objects in the scene.

11. The method of claim 1, further comprising:
receiving user input specifying a subject of interest in the scene;
and wherein outputting an indication of at least one light-field characteristic of the captured light-field data comprises outputting an indication of at least one light-field characteristic of the captured light-field data with respect to the specified subject of interest.

12. The method of claim 1, wherein outputting an indication of at least one light-field characteristic of the captured light-field data comprises outputting an indication of a refocus range.

13. The method of claim 1, wherein outputting an indication of at least one light-field characteristic of the captured light-field data comprises outputting a depth map corresponding to the live view of the scene.

14. The method of claim 1, wherein outputting an indication of at least one light-field characteristic of the captured light-field data comprises altering a visual characteristic of a subset of pixels of the displayed live view to indicate depth information corresponding to those pixels.

15. The method of claim 14, wherein altering a visual characteristic of a subset of pixels of the displayed live view comprises changing colors of pixels corresponding to areas of the scene currently in focus.

16. The method of claim 1, wherein outputting an indication of at least one light-field characteristic of the captured light-field data comprises visually displaying the indication.

17. The method of claim 1, wherein outputting an indication of at least one light-field characteristic of the captured light-field data comprises outputting a real-time indication of the light-field characteristic.

18. The method of claim 1, wherein outputting an indication of at least one light-field characteristic of the captured light-field data comprises outputting an animated indication of the light-field characteristic.

19. The method of claim 1, wherein outputting an indication of at least one light-field characteristic of the captured light-field data comprises overlaying the indication of the at least one light-field characteristic on the displayed two-dimensional video stream.

20. The method of claim 1, wherein outputting an indication of at least one light-field characteristic of the captured light-field data comprises outputting an auditory indicator of the at least one light-field characteristic.

21. The method of claim 1, wherein outputting an indication of at least one light-field characteristic of the captured light-field data comprises outputting a haptic indicator of the at least one light-field characteristic.

22. The method of claim 1, further comprising:
receiving user input requesting display of the indication of a light-field characteristic corresponding to the displayed live view;
and wherein outputting an indication of at least one light-field characteristic of the captured light-field data is performed responsive to the received user input.

23. In a light-field image capture device, a method for controlling optical components in connection with light-field image capture, comprising:
identifying a desired characteristic for captured light-field data representing a scene;
automatically adjusting at least one of a physical position and a physical configuration of an optical component of the device to increase suitability of the device for capture of light-field data having the desired characteristic; and
using the optical component to capture light-field data representing the scene.

24. The method of claim 23, wherein identifying a desired characteristic comprises identifying a particular refocus range.

25. The method of claim 23, wherein the desired characteristic comprises refocusable-to-infinity tracking, and wherein automatically adjusting at least one of a physical position and a physical configuration comprises adjusting a focus position to permit refocusing to optical infinity.

26. The method of claim 23, wherein the desired characteristic comprises refocusability to a specified minimum close distance, and wherein automatically adjusting at least one of a physical position and a physical configuration comprises adjusting a focus position to permit refocusing to the specified minimum close distance.

27. The method of claim 23, further comprising:
receiving user input specifying a subject of interest;
and wherein automatically adjusting at least one of a physical position and a physical configuration comprises adjusting a focus position to keep the subject of interest within a refocusable range.

28. The method of claim 23, further comprising:
receiving user input specifying at least two subjects of interest;
and wherein automatically adjusting at least one of a physical position and a physical configuration comprises adjusting a focus position to keep the subject of interest within a refocusable range.

29. The method of claim 23, further comprising:
analyzing previously captured light-field data for the scene;
based on the analysis, determining a focus position to optimize a refocusable range of captured light-field data with respect to the scene;
and wherein automatically adjusting at least one of a physical position and a physical configuration comprises adjusting the optical component to achieve the determined focus position.

30. The method of claim 23, further comprising:
analyzing previously captured light-field data for the scene;
based on the analysis, determining a focus position to optimize a refocusable range of captured light-field data with respect to a portion of the scene;
and wherein automatically adjusting at least one of a physical position and a physical configuration comprises adjusting the optical component to achieve the determined focus position.

31. The method of claim 23, further comprising:
identify at least one face in previously captured light-field data for the scene;
based on the analysis, determining a focus position to optimize a refocusable range of captured light-field data with respect to the identified at least one face;
and wherein automatically adjusting at least one of a physical position and a physical configuration comprises adjusting the optical component to achieve the determined focus position.

32. In a light-field image capture device, a real-time focusing method, comprising:
capturing light-field data representing a scene;
concurrently with the capture of the light-field data, performing the steps of:
processing the captured light-field data to generate a two-dimensional video stream representing a live view of the scene;
displaying the two-dimensional video stream on a display device;
receiving user input specifying a location of a subject of interest within the displayed video stream; and
automatically adjusting at least one optical component of the device to focus on the specified subject of interest.

33. The method of claim 32, wherein receiving user input specifying a location of a subject of interest comprises detecting user contact at a location on a touchscreen.

34. The method of claim 32, further comprising:
detecting a change by the user in a zoom position of the device; and
responsive to the detected change, automatically adjusting at least one optical component of the device to maintain focus on the specified subject of interest.

35. The method of claim 32, wherein automatically adjusting at least one optical component of the device to focus on the specified subject of interest comprises successively reducing focus range based on analysis of the captured light-field data.

36. The method of claim 35, wherein reducing focus range based on analysis of the captured light-field data comprises:
for each of a number of frames representing focus depths within the focus range:
applying a high-pass filter to the captured light-field data; and
generating a score based on the results of the high-pass filter, to determine an amount of in-focus information is contained in the vicinity of the specified subject of interest; and
comparing the generated scores to determine a focus position corresponding to best focus.

37. In a light-field image capture device, a method of running a software application adapted to a two-dimensional image capture device, comprising:
running a software application adapted to receive two-dimensional images;
capturing light-field data representing a scene;
automatically determining a set of two-dimensional images to be generated from the captured light-field data;
performing light-field processing on the captured light-field data to generate the determined set of two-dimensional images; and
making the generated set of two-dimensional images available to the software application.

38. In a light-field image capture device, a method of generating a plurality of two-dimensional video streams from a single stream of light-field data, comprising:
capturing a stream of light-field data representing a scene;
performing light-field processing on the captured light-field data to generate at least two two-dimensional video streams, wherein different parameters are used to generate each two-dimensional video stream; and
outputting the at least two two-dimensional video streams.

39. The method of claim 38, wherein outputting the at least two two-dimensional video streams comprises outputting the at least two two-dimensional video streams substantially in real-time with respect to the capturing step.

40. The method of claim 38, further comprising:
receiving user input specifying at least two sets of parameters for the two-dimensional video streams;
and wherein performing light-field processing on the captured light-field data to generate at least two two-dimensional video streams comprises performing light-field processing according to the specified sets of parameters.

41. In a light-field image capture device, a computer program product for providing feedback to a user in connection with light-field image capture, comprising:
a non-transitory computer-readable storage medium; and
computer program code, encoded on the medium, configured to cause at least one processor to perform the steps of, concurrently with capture of light-field data at the light-field image capture device:
processing the captured light-field data to generate a two-dimensional video stream representing a live view of the scene;
causing a display screen to display the two-dimensional video stream; and
causing an output device to output, concurrently with the display of the live view, an indication of at least one light-field characteristic of the captured light-field data corresponding to the displayed live view.

42. The computer program product of claim 41, further comprising computer program code configured to cause at least one processor to cause an input device to be receptive to user input specifying a subject of interest in the scene;
and wherein the computer program code configured to cause an output device to output an indication of at least one light-field characteristic of the captured light-field data comprises computer program code configured to cause the output device an indication of at least one light-field characteristic of the captured light-field data with respect to the specified subject of interest.

43. The computer program product of claim 41, wherein the computer program code configured to cause an output device to output an indication of at least one light-field characteristic of the captured light-field data comprises computer program code configured to cause an output device to output an indication of a refocus range.

44. The computer program product of claim 41, wherein the computer program code configured to cause an output device to output an indication of at least one light-field characteristic of the captured light-field data comprises computer program code configured to cause an output device to output a depth map corresponding to the live view of the scene.

45. The computer program product of claim 41, wherein the computer program code configured to cause an output device to output an indication of at least one light-field characteristic of the captured light-field data comprises the computer program code configured to cause an output device to output a real-time indication of the light-field characteristic.

46. The computer program product of claim 41, wherein the computer program code configured to cause an output device to output an indication of at least one light-field characteristic of the captured light-field data comprises the computer program code configured to cause the display screen to overlay the indication of the at least one light-field characteristic on the displayed two-dimensional video stream.

47. In a light-field image capture device, a computer program product for performing real-time focusing, comprising:
    a non-transitory computer-readable storage medium; and
    computer program code, encoded on the medium, configured to cause at least one processor to perform the steps of, concurrently with capture of light-field data representing a scene at the light-field image capture device:
        processing the captured light-field data to generate a two-dimensional video stream representing a live view of the scene;
        causing a display screen to display the two-dimensional video stream;
        receiving user input specifying a location of a subject of interest within the displayed video stream; and
        automatically adjusting at least one optical component of the device to focus on the specified subject of interest.

48. A system configured to provide feedback to a user in connection with light-field image capture, comprising:
    a light-field image capture device configured to capture light-field data:
    a processor, communicatively coupled to the light-field image capture device, configured to, concurrently with the capture of light-field data, process the captured light-field data to generate a two-dimensional video stream representing a live view of the scene;
    a display screen, communicatively coupled to the processor, configured to display the two-dimensional video stream and to display, concurrently with the display of the live view, an indication of at least one light-field characteristic of the captured light-field data corresponding to the displayed live view.

49. The system of claim 48, further comprising:
    an input device, communicatively coupled to the processor, configured to be receptive to user input specifying a subject of interest in the scene;
    and wherein the display screen is configured to display an indication of at least one light-field characteristic of the captured light-field data by displaying an indication of at least one light-field characteristic of the captured light-field data with respect to the specified subject of interest.

50. The system of claim 48, wherein the display screen is configured to display an indication of at least one light-field characteristic of the captured light-field data by displaying an indication of a refocus range.

51. The system of claim 48, wherein the display screen is configured to display an indication of at least one light-field characteristic of the captured light-field data by displaying a depth map corresponding to the live view of the scene.

52. The system of claim 48, wherein the display screen is configured to display a real-time indication of the light-field characteristic.

53. The system of claim 48, wherein the display screen is configured to overlay the indication of the at least one light-field characteristic on the displayed two-dimensional video stream.

54. A system for performing real-time focusing, comprising:
    a light-field image capture device configured to capture light-field data:
    a processor, communicatively coupled to the light-field image capture device, configured to, concurrently with the capture of light-field data, process the captured light-field data to generate a two-dimensional video stream representing a live view of the scene;
    a display screen, communicatively coupled to the processor, configured to display the two-dimensional video stream; and
    an input device, communicatively coupled to the processor, configured to be receptive to user input specifying a location of a subject of interest within the displayed video stream;
    wherein the processor is further configured to cause at least one optical component of the device to be automatically adjusted to focus on the specified subject of interest.

\* \* \* \* \*